US007289436B2

(12) United States Patent
Schaller et al.

(10) Patent No.: US 7,289,436 B2
(45) Date of Patent: Oct. 30, 2007

(54) SYSTEM AND METHOD FOR PROVIDING MANAGEMENT OF FABRIC LINKS FOR A NETWORK ELEMENT

(75) Inventors: William Schaller, Stittsville (CA); Jonathan Spratley, Ottawa (CA); Derrick A Nagy, Nepean (CA); Chung Kei Leung, Ottawa (CA); Alexei Permiakov, Ottawa (CA); Tom C Wilson, Kanata (CA); Daniel Gravelle, Kanata (CA)

(73) Assignee: Alcatel Canada Inc., Kanata (CA)

( * ) Notice: Subject to any disclaimer, the term of this patent is extended or adjusted under 35 U.S.C. 154(b) by 1132 days.

(21) Appl. No.: 10/271,564

(22) Filed: Oct. 17, 2002

(65) Prior Publication Data
US 2003/0137934 A1    Jul. 24, 2003

(30) Foreign Application Priority Data
Jan. 24, 2002   (CA)   ................................ 2369201

(51) Int. Cl.
G06F 11/00  (2006.01)
(52) U.S. Cl. .................. 370/225; 370/252; 370/360
(58) Field of Classification Search ................ 370/225, 370/226, 227
See application file for complete search history.

(56) References Cited

U.S. PATENT DOCUMENTS

| | | | | |
|---|---|---|---|---|
| 5,410,536 A | * | 4/1995 | Shah et al. ................ | 370/216 |
| 5,870,382 A | * | 2/1999 | Tounai et al. .............. | 370/220 |
| 6,021,111 A | * | 2/2000 | Soga ......................... | 370/221 |
| 6,181,679 B1 | | 1/2001 | Ashton et al. | |
| 6,868,057 B1 | * | 3/2005 | Sha ........................... | 370/216 |
| 6,879,559 B1 | * | 4/2005 | Blackmon et al. ......... | 370/225 |
| 7,233,568 B2 | * | 6/2007 | Goodman et al. .......... | 370/218 |
| 2003/0058791 A1 | * | 3/2003 | Soetemans et al. ........ | 370/225 |

FOREIGN PATENT DOCUMENTS

| | | |
|---|---|---|
| GB | 2 224 628 | 12/1991 |
| WO | WO 01/65783 | 9/2001 |

* cited by examiner

*Primary Examiner*—Hassan Kizou
*Assistant Examiner*—Brian Roberts
(74) *Attorney, Agent, or Firm*—McCarthy Tetrault LLP

(57) ABSTRACT

A system and method for managing communication links connecting components in a network element is provided. The network element has a first component, a second component and at least two communication links. The communication links are adapted to provide a first connection and a second connection between the first component and the second component. The system includes, for each communication link of the at least two communication links connected to the first component and adapted to provide the first connection and the second connection, a detection module adapted to monitor a given communication link for an error. The system also includes, for each communication link connected to the second component and adapted to provide the first connection and the second connection, another detection module adapted to monitor another given communication link for an error. The system further includes a collection module communicating with each the detection module to collect information about any errors detected thereby and to provide a status report of each communication link.

23 Claims, 9 Drawing Sheets

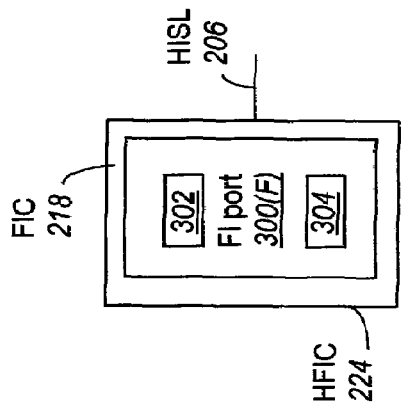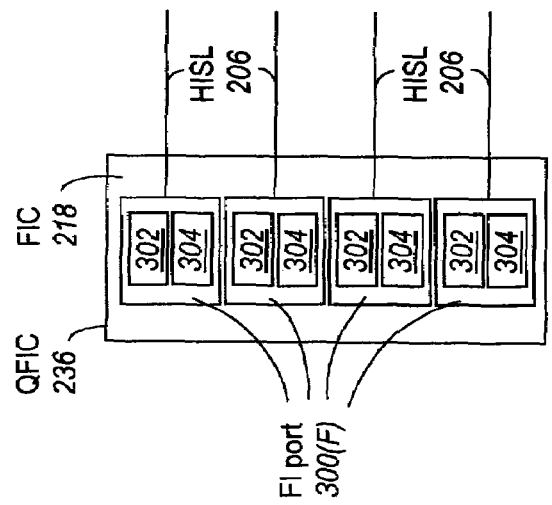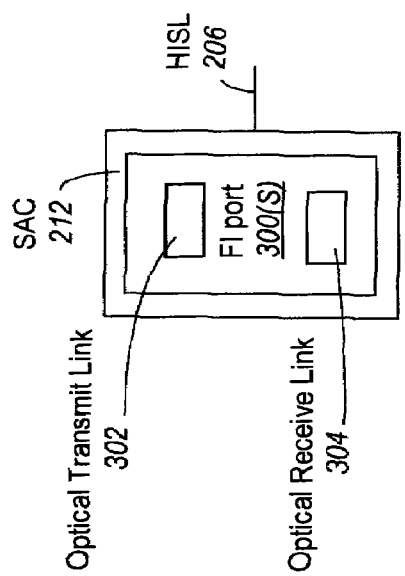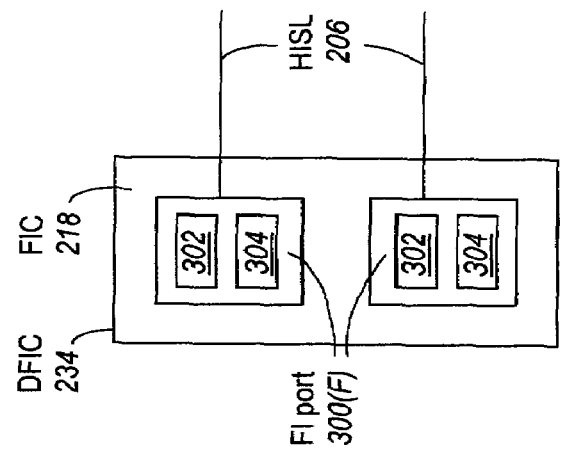

SYSTEM AND METHOD FOR PROVIDING MANAGEMENT OF FABRIC LINKS FOR A NETWORK ELEMENT

FIELD OF THE INVENTION

The invention relates to a system and method for providing management of fabric links for a network element.

BACKGROUND OF INVENTION

Communications switch and router systems need to provide a low failure rate for communication routing and transmission. Many systems use an architecture which provides redundant communication capabilities to switch away from failures when they occur. A common reliability measure is whether or not the system provides six 9's reliability, i.e. is available 99.9999% of a given time period. This requires rapid fault detection and correction.

Redundant fabric links in a network element provide a pair of redundant datapaths through the network element. Switching from the active fabric link to the redundant fabric link in the network element provides the same data to the destination. Redundant fabric links may require a specific configuration to provide this redundancy in the network element. Additionally, fabric links in the network element may have many components. Maintaining the fabric links in the network element provides challenges to the operator in isolating and detecting faults in a timely manner.

There is a need for a system and method for providing management of fabric links for a network element.

SUMMARY OF INVENTION

In a first aspect, a system for managing communication links connecting components in a network element is provided. The network element has a first component, a second component and at least two communication links. The communication links are adapted to provide a first connection and a second connection between the first component and the second component. The system includes, for each communication link of the at least two communication links connected to the first component and adapted to provide the first connection and the second connection, a detection module adapted to monitor a given communication link for an error. The system also includes, for each communication link connected to the second component and adapted to provide the first connection and the second connection, another detection module adapted to monitor another given communication link for an error. The system further includes a collection module communicating with each the detection module to collect information about any errors detected thereby and to provide a status report of each communication link.

The first connection and the second connection may be adapted to provide an active and a redundant datapath connection between the first component and the second component.

The network element may utilize the status report of each communication link to select a datapath route among the communication links.

The first component may include first ports, each communication link connecting to the first component connecting at a first port. The second component may include second ports, each communication link connecting to the second component connecting at a second port. In the first component, each detection module may monitor the first port connected to its associated communication link and, in the second component, each detection module may monitor the second port connected to its associated communication link.

The system may further include a configuration module communicating with each detection module. The configuration module may store a configuration record for connecting the first ports on the first component with the second ports on the second component with the communication links. The detection module of each communication link connected to the first component may communicate with the configuration module to monitor its associated communication link for an error relating to the configuration record. The detection module of each communication link connected to the second component may communicate with the configuration module to monitor its associated communication link for an error relating to the configuration record.

For each communication link, the configuration module may store a first identity of an assigned first port on the first component and a second identity of an assigned second port on the second component, the communication link assigned to connect to the assigned first port and the assigned second port. Each detection module may compare an identity of the first port connected to the communication link to the first identity of the assigned first port and, when the identity of the first port does not match the first identity, signal a cabling error. Each detection may compare an identity of the second port connected to the communication link to the second identity of the assigned second port and, when the identity of the second port does not match the second identity, signal a cabling error.

The network element may include shelves, the first component being an input/output shelf and the second component being a switching core including at least one shelf.

The switching core may have at least one core card. Each second port of the second component may connect to the core cards over a separate switching core connection. In the second component, each detection module may monitor the separate switching core connection connected to the second port connected to its associated communication link.

The communication links may be cables.

For each communication link of the two communication links connected to the first component and adapted to provide the first connection and the second connection, if the detection module adapted to monitor the given communication link detects an error, the detection module may selectively reset the given communication link.

In a second aspect, a system for managing a communication link connecting components in a multi-shelf network element is provided. The multi-shelf network element has a first shelf, at least one second shelf and at least one communication link. The communication links are adapted to provide a connection between the first shelf and the second shelf. The system includes, for each communication link connected to the first shelf and adapted to provide the connection, a detection module adapted to monitor a given communication link for an error. The system also includes, for each communication link connected to the second shelves and adapted to provide the connection, another detection module adapted to monitor another given communication link for an error. The system also includes a collection module adapted to communicate with each detection module to collect information about any errors detected thereby and to provide a status report for each communication link.

In a third aspect, a method of managing communication links connecting components in a network element is provided. The network element has a first component, a second component and at least two communication links. The communication links are adapted to provide a first connection and a second connection between the first component and the second component. The method includes monitoring for an error in each communication link connected to the first component and adapted to provide the first connection and the second connection and monitoring for an error in each communication link connected to the second component and adapted to provide the first connection and the second connection. The method also includes collecting information about any errors detected and providing a status report for each communication link.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 3A is a block diagram of components of a switch access card of switching shelves of FIG. 2;

FIG. 3B is a block diagram of components of a high speed fabric interface card of one of the I/O shelves of FIG. 2;

FIG. 3C is a block diagram of components of a dual fabric interface card of one of the I/O shelves of FIG. 2;

FIG. 3D is a block diagram of components of a quad fabric interface card of one of the I/O shelves of FIG. 2;

DETAILED DESCRIPTION OF THE EMBODIMENTS

Figure 1:
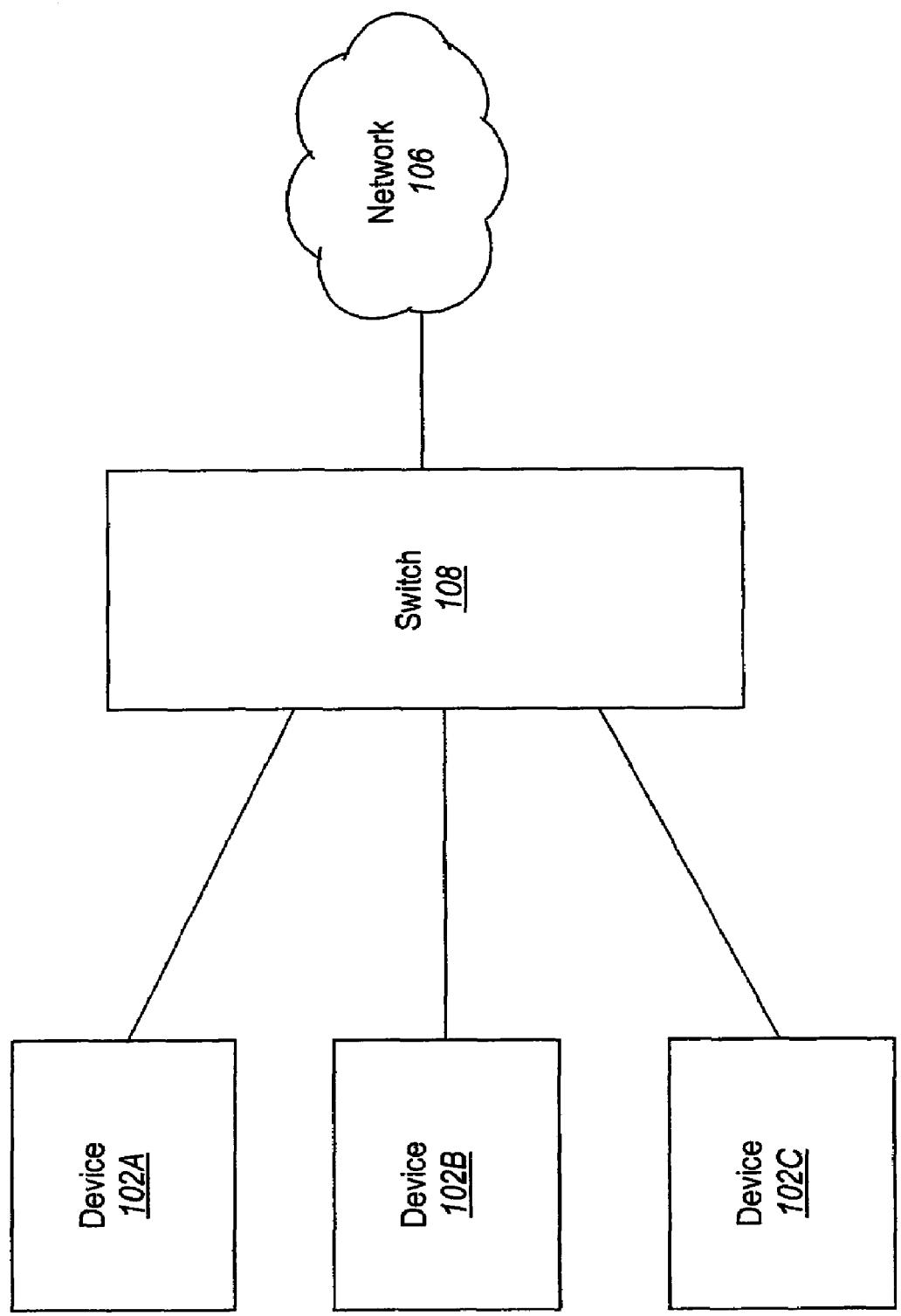
FIG. 1 is a block diagram of a network connected to a switch embodying the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Briefly, the system and method of the embodiment enable a network element to manage its internal links and components by providing updated information on the status and configuration of those links and components. The management of the internal links and components of a network element includes at least any one of the following functions: provisioning, maintaining and monitoring of internal links and components. For the embodiment, first a description is provided for the system architecture for an associated network element followed by a description of the elements that monitor components of the network element. For the purposes of this description, a packet is a 72 byte cell sent through various components of the switch associated with the embodiment. The packet size changes as it enters or exits line card and input/output (I/O) cards in the switch associated with the embodiment.

1.0 System Architecture

The following is a description of a network element associated with the switch associated with the embodiment.

Referring to FIG. 1, switch 108 is shown. Switch 108 connects devices 102A, 102B and 102C such as customer premise equipment (CPEs). Switch 108 may also connect to network cloud 106 and provide a connection point for devices 102 to network cloud 106.

Switch 108 incorporates the redundant switch fabric architecture of the embodiment. It will be appreciated that terms such as "network element", "routing switch", "communication switch", "communication device", "switch" and other terms known in the art may be used to describe switch 108. Further, while the embodiment is described for switch 108, it will be appreciated that the system and method described herein may be adapted to any switching system.

Figure 2:
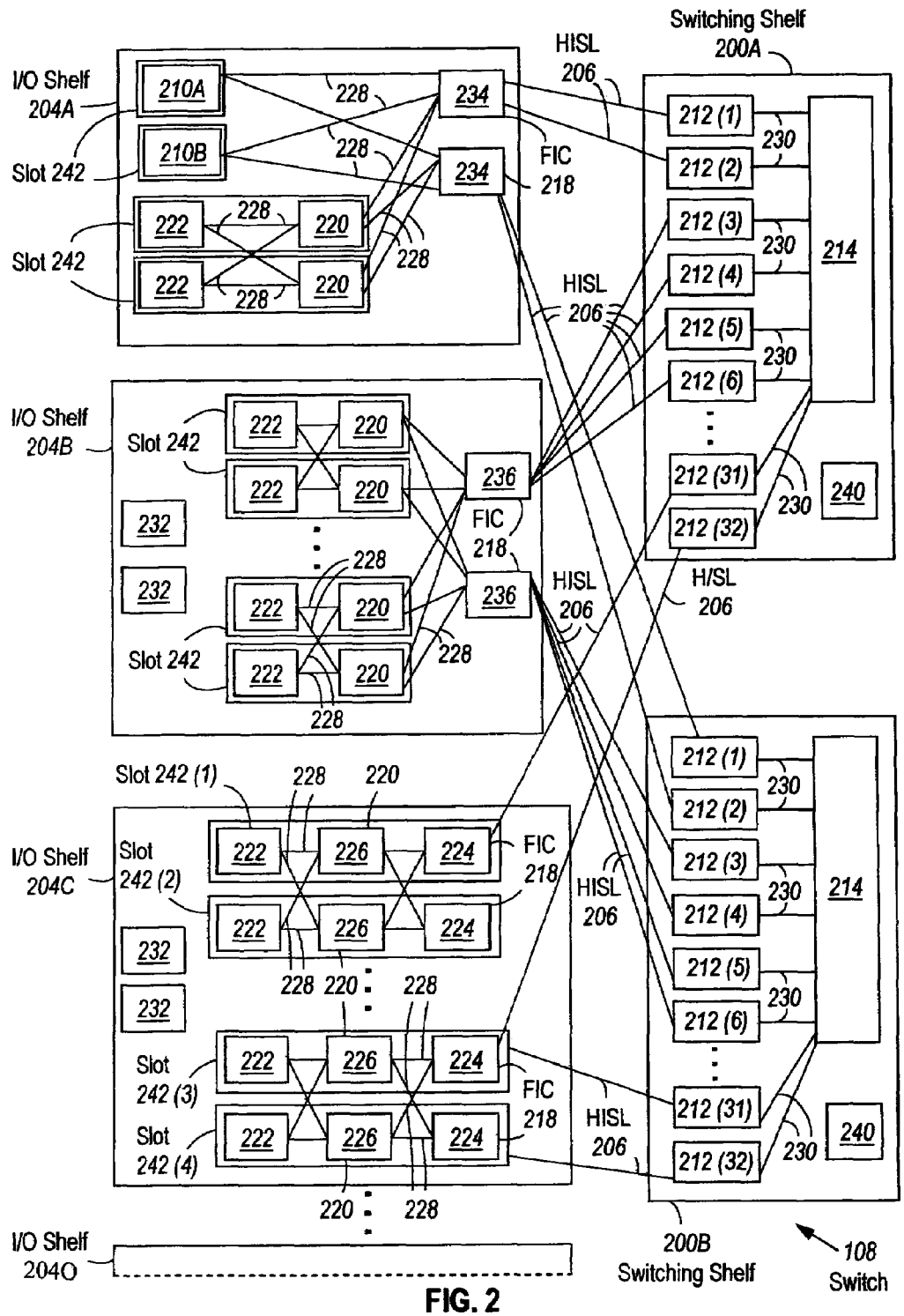
FIG. 2 is a block diagram of switching shelves, I/O shelves and connections therebetween of the switch of FIG. 1.

Now referring to FIG. 2, switch 108 allows scaling of the switching fabric capacity simply by the insertion of additional shelves or cards into the multishelf switch system. Switch 108 is a multi-shelf switching system enabling a high degree of re-use of single shelf technologies. Switch 108 comprises two switching shelves 200A and 200B, a control complex residing on an I/O shelf 204A and I/O shelves 204B . . . 204O, (providing a total of 15 I/O shelves) and the various shelves and components in switch 108 allow data to pass through data links. Switching shelf 200A and 200B provide cell switching capacity for switch 108. I/O shelves 204 provide I/O for switch 108, allowing connection of devices, like devices 102A, 102B, and 102C (FIG. 1), to switch 108. The control complex on I/O shelf 204A is a separate shelf with control cards 210A and 210B which provide central management for switch 108.

Communication links enable switching shelves 200, and I/O shelves 204 to communicate data and status information with each other. High Speed Inter Shelf Links (HISL) 206 and Control Service Links (CSLs) (not shown) link control complex on I/O shelf 204A with switching shelves 200A and 200B. Other CSLs (not shown) link control complex on I/O shelf 204A with the other I/O shelves 204B . . . 204O. HISLs 206 also link switching shelves 200 with I/O shelves 204. In the embodiment, two cables bundled together form each HISL 206. One cable carries traffic transmitted from an I/O shelf 204 and received at a switching shelf 200, the other carries traffic transmitted from the same switching shelf 200 and received at the same I/O shelf 204.

The HISLs 206 connecting switching shelves 200 with I/O shelves 204 in the embodiment, use parallel optical interfaces carrying unframed data. Since the parallel optical interfaces comprise a plurality of parallel lines, twelve lines in HISL 206 of the embodiment, which simultaneously send part of a packet, these lines as well as corresponding circuits and buffers at either end require proper synchronization. The embodiment performs packet synchronization by detecting consecutive control packets being sent between switching shelves 200 and their connected I/O shelves 204. Switching shelves 200 and I/O shelves 204 communicate with each other to ensure data from a packet segmented between the twelve fibres in HISL 206 arrives in the correct time period.

A terminal (not shown) is connected to switch 108 and runs controlling software, which allows an operator to modify, and control the operation of, switch 108.

Each switching shelf 200A and 200B contains a switching fabric core 214, a switching shelf controller card 240 and up to 32 switch access (SAC) cards 212(1) . . . 212(32). A midplane (not shown) provides a physical connection mechanism for the switching fabric core 214 and the SAC cards 212 and provides electrical (in our implementation these are optical) connections 230 as internal traces in the midplane therebetween to enable the components to communicate with each other. Each SAC port 300(S) provides 25 million cells per second throughput to and from switching fabric core 214 through internal core connections 230. Each SAC card 212 communicates with the I/O shelves 204 through Fabric Interface Cards (FICS) 218.

Switching shelf controller cards 240 provide a centralized unit responsible for configuring, monitoring and maintaining all elements within switching shelf 200. Each controller card 240 controls SAC cards 212, switching matrix (SMX) cards (described later), switching scheduler card (SCH) (described later), an alarm panel (not shown) and a fan control module (not shown) on its respective switching shelf 200 of switch 108. It also provides clock signal generation and clock signal distribution to all switching devices within switching shelf 200. Due to its centralized location, controller card 240 is considered to be part of the switching fabric.

Control complex on I/O shelf 204A comprises an overall pair of redundant control cards, a redundant pair of inter-shelf connection (ICON) cards, an ICON—I/O card, a Control Interconnect Card (CIC card) for each control card and a single Facilities Card (FAC card). The ICON card interconnects I/O shelf 204A to all I/O shelf controller cards 232 and switching shelf controller cards 240 on the other shelves in the system. The FAC provides an interface to provide external clocking for system timing. The CIC provides craft interface to communicate with the control cards.

An I/O shelf 204 communicates with its connected device 102 (FIG. 1) via I/O card 222. Data received from its connected device by I/O card 222 is forwarded to a Line Processing Card (LPC) 220 for processing of the traffic. The processed traffic is provided to a FIC 218 which provides an interface point for I/O shelf 204 to the switching shelf 200. As with the switching shelf 200, the I/O card 222, LPC 220 and FIC 218 are physically connected to a midplane which provides internal signalling traces between the cards.

There are two types of I/O shelves 204. The first type is a High Speed Peripheral Shelf (HSPS), represented as I/O shelf 204C. I/O shelf 204C contains Line Processing Cards (LPCs) 220 in the form of High Speed Line Processing (HLPC) Cards 226, I/O cards 222, FICs 218 in the form of High Speed Fabric Interface Cards (HFIC) 224 and accesses two redundant shelf controller cards 232 in the form of High Speed Shelf Controller (HSC) cards. An I/O card 222, a HLPC 226, and a HFIC 224 are connected to form a datapath through I/O shelf 204C and are grouped into a slot 242.

The second type is a Peripheral Shelf (PS), represented as I/O shelves 204A and 204B. They contain LPCs 220, I/O cards 222 and FICs 218. The FICs 218 are either configured as Dual Fabric Interface Cards (DFIC) 234, as shown in I/O shelf 204A, or Quad Fabric Interface Cards (QFIC) 236, as shown in I/O shelf 204B. In I/O shelves 204A and 204B, an I/O card 222 and a LPC 220 are grouped into a slot 242 and are connected with FICs 218 to form a datapath through its I/O shelf 204A or 204B. I/O shelf 204B also has access to two shelf controller cards 232.

In the embodiment, slots 242 are numbered in sequence 1 to n, n being an even number, and may be grouped sequentially into redundant pairs, slots 242(1) and 242(2), slots 242(3) and 242(4), . . . slots 242(n−1) and 242(n) being redundant pairs, to provide redundant data paths through I/O shelves 204. They may also work non-redundantly as individual slots 242(1), 242(2) . . . slot 242(n−1) and 242(n).

Referring to FIGS. 3A-D, further details on the elements of particular SAC cards 212 and FICs 218 are provided. In FIG. 3A, SAC port 300(S) is shown connected to HISL 206. SAC card 212 has one Fabric Interface (FI) port 300(S) and transmits traffic from optical transmit link 302 in FI port 300(S) to FIC 218. SAC port 300(S) receives traffic at optical receive link 304 in FI port 300(S) from FIC 218.

Referring to FIG. 3B, FIC 218 represents HFIC 224 of I/O shelf 204C of FIG. 2 and is shown connected to HISL 206. HFIC 224 has one FI port 300(F) and transmits traffic from optical transmit link 302 in FI port 300(F) to SAC port 300(S). HFIC 224 receives traffic at optical receive link 304 in FI port 300(F).

Referring to FIG. 3C, FIC 218 represents DFIC 234 of I/O shelf 204A of FIG. 2 and is shown connected to two HISLs 206. DFIC 234 has two FI ports 300(F) and transmits traffic from optical transmit link 302 in each of FI ports 300(F) over HISL 206 to two SAC cards 212. DFIC 234 receives traffic at optical receive link 304 in each of FI ports 300(F) from two SAC cards 212, one SAC port 300(S) connecting to each FI port 300(F).

Referring to FIG. 3D, FIC 218 represents QFIC 236 of I/O shelf 204B of FIG. 2 and is shown connected to four HISLs 206. QFIC 236 has four FI ports 300(F) and transmits traffic from optical transmit link 302 in each of FI ports 300(F) to four SAC cards 212. QFIC 236 receives traffic at optical receive link 304 in each of FI ports 300(F) from four SAC cards 212, one SAC port 300(S) connecting to each FI port 300(F).

For each FIC 218 and SAC card 212 in FIGS. 3A-3D, as noted previously, each HISL 206 contains two fibre optic cables, a receive and a transmit cable, connecting FIC 218 and SAC card 212. Therefore, HISL 206 connects both optical transmit link 302 and optical receive link 304 in FI port 300(F) of FIC 218 to the same SAC card 212 and both optical transmit link 302 and optical receive link 304 in FI port 300(S) of SAC port 300(S) to the same FI port 300(F) in FIC 218.

Referring again to FIG. 2, redundant datapaths through switch 108 allow switch 108 to select data through a live redundant datapath when a fault is encountered on the active datapath. Fabric redundancy is provided in switch 108 by having a FIC 218 associated with a redundant FIC 218, each connected to a non-redundant LPC 220 or a pair of redundant LPCs 220 in redundant slots 242, and cabling the redundant pair of FICs 218 to separate switching shelves 200A and 200B. Each FIC 218 in an I/O shelf 204 receives data from the active working LPC 220 in slot 242.

Switch 108 chooses a LPC 220 from a redundant pair of slots 242 from which to route data through the redundant pair of FI ports 300(F) in a pair of redundant FICs 218 to switching shelves 200A and 200B. This LPC 220 is the active LPC 220. It will be appreciated that if only one LPC 220 is provided in a pair of redundant slots 242, that LPC 220 is the active LPC 220. In the embodiment, a FIC 218, for example FIC 218 in slot 242(1), is connected to switching shelf 200A while the other FIC 218 of the redundant pair, FIC 218 in slot 242(2), is connected to switching shelf 200B. FIC 218 in slot 242(2) in this configuration cannot also connect to a SAC card 212 on switching shelf 200A and still provide appropriate redundancy for FIC 218 in slot 242(1).

Switch 108 requires cabling rules to be followed for cabling of I/O shelves 204 with switching shelves 200. Accordingly, the embodiment forces that a HISL 206 connected to a FI port 300(F) corresponding to an odd numbered FIC slot 242 be connected to switching shelf 200A and that a HISL 206 connected to a FI port 300(F) corresponding to an even numbered FIC slot 242 be connected to switching shelf 200B. Since each pair of redundant slots 242 consist of one odd and one even numbered slot 242, this ensures switching fabric redundancy by routing one data path through switching shelf 200A and the other through switching shelf 200B. It will be appreciated that other cabling rules may be implemented in other embodiments to assist in providing the redundancy of switch 108. It will also be appreciated that, in other embodiments, switch 108 may have no cabling rules to assist in providing redundancy.

Figure 4:
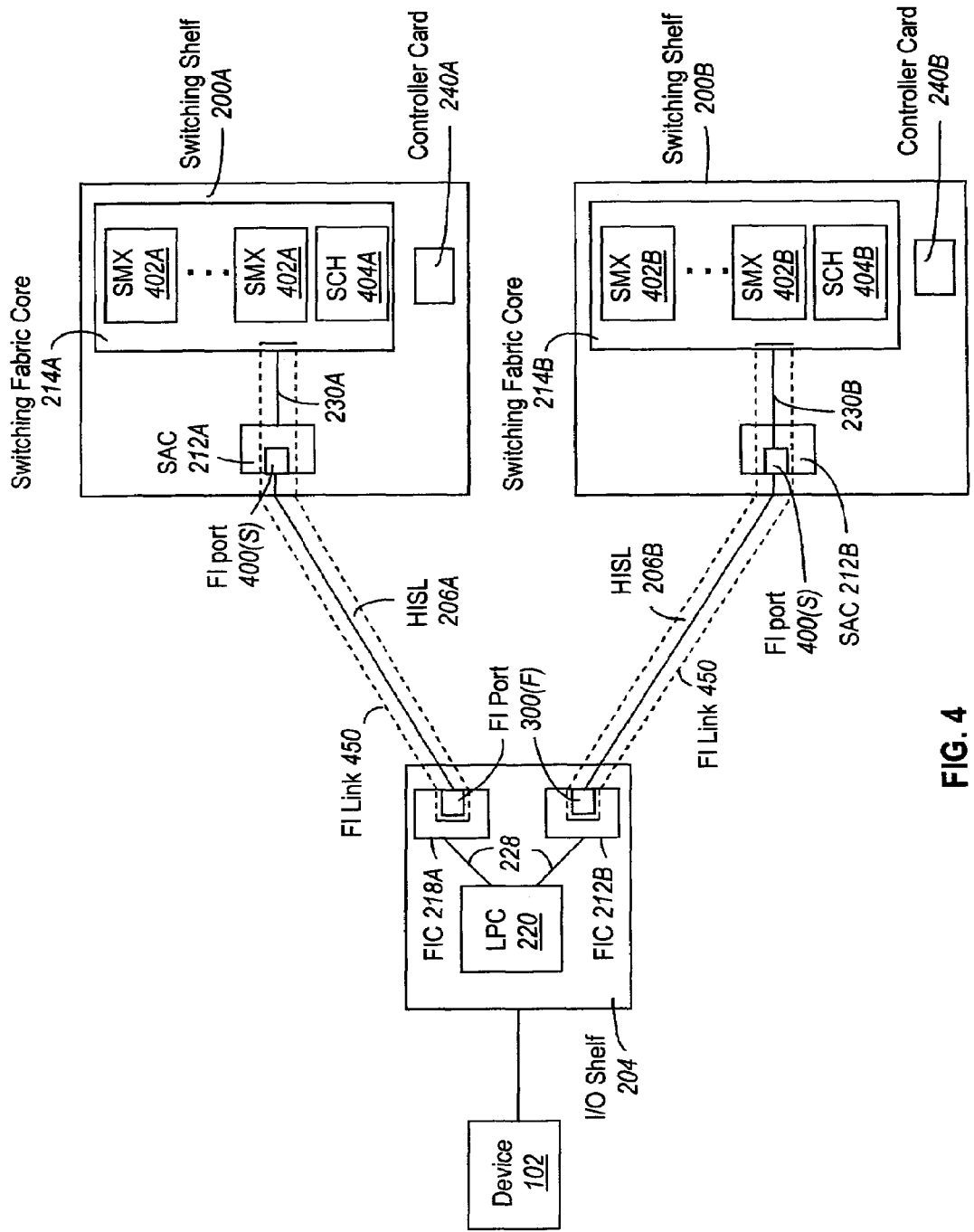
FIG. 4 is a block diagram of a fabric interface link associated with components of the switch of FIG. 1.

FIG. 4 illustrates aspects of switching data in switching shelves 200 through redundant datapaths where the following convention is used for reference numbers. There are two fabrics, A and B. Accordingly all elements associated with fabric A have a suffix A associated with it. Similarly all elements associated with fabric B have a suffix B associated with it. There is an ingress path and an egress path for each fabric although only the ingress path is shown in FIG. 4.

Redundant switching shelves 200A and 200B receive data traffic from devices 102 connected to an I/O shelf 204 of switch 108, process the traffic through their respective fabrics, then forward the traffic in the egress direction (not shown) to the correct egress port on an I/O shelf 204 of switch 108. Any traffic which can be sent on shelf 200A is also sent to shelf 200B. FIC 218A is associated with fabric A and shelf 200A. FIC 218B is associated with fabric B and shelf 200B. Switch 108 handles redundant datapath switching in the following manner.

Ingress I/O shelf 204 receives ingress data traffic from device 102 at LPC 220. Although the embodiment allows for a pair of redundant LPCs 220, only the active LPC 220 is shown in FIG. 4 for ease of explanation. LPC 220 forwards the same traffic to both FICs 218A and 218B over midplane connections 228. FIC 218A is associated with fabric A and shelf 200A. FIC 218B is associated with fabric B and shelf 200B. Accordingly, I/O shelf 204 provides the traffic substantially simultaneously to both fabric A and fabric B. It is presumed, for this example, that fabric A is the active fabric and fabric B is the redundant fabric.

From FI port 300(F) in FIC 218A, the traffic is sent over HISL 206A to FI port 300(S) to switching shelf 200A; from FI port 300(F) in FIC 218B, the redundant traffic is sent to switching shelf 200B.

In switching shelves 200A and 200B, ingress SAC cards 212A and 212B respectively receive the traffic and forward it to switching fabric core 214 over connections 230.

Switching fabric core 214 has six SMX cards 402. Each SMX card 402 provides a selectable output stream for data traffic received through its input stream. The set of the six SMX cards 402 constitutes a non-blocking 32×32 switching fabric core of the switching path fabric for one switching shelf 200. Cell switching both to and from all SAC cards 212 occurs across the six SMX cards 402. In the embodiment all six SMX cards 402 must be present and configured to provide an operational switching fabric core 214 for one switching shelf 200. For each SAC card 212, each connection 230 to switching fabric core 214 includes six Switching Core Interface (SCI) connections, one SCI connection to each SMX card 402. SCI connections are traces connecting SAC cards 212 and switching fabric core 214. In the embodiment, each trace carries one sixth of the data from SAC card 212 to switching fabric core 214. Accordingly, a fault in one SCI connection affects the integrity of data transmitted by connection 230.

Also, each switching fabric core 214 has a SCH 404 which provides centralized arbitration of traffic switching for switching shelf 200 by defining, assigning and processing multiple priorities of arbitration of data traffic processed by the switching fabric of switching shelf 200. Accordingly, the use of the priorities allows switch 108 to offer multiple user-defined quality of service. SCH 404 must be present and configured to constitute an operating switching fabric core 214. In the embodiment, each connection 230 also includes one SCI connection to SCH 404.

Once the traffic is sent through switching fabric core 214, the traffic is sent in the egress direction (not shown) to egress SAC cards 212 over connections 230. Data transmitted to an I/O shelf 204 from switching shelves 200 must identify the egress FIC 218 and the egress FI port 300(F) to arrive at the appropriate destination LPCs 220. Switching shelves 200 use this information to choose the appropriate egress SAC card 212, i.e. the SAC card 212 connected to the identified egress FIC 218 and the egress FI port 300(F). A connect module provides routing destination information for a particular SAC card 212 and FIC 218. The connect module includes a database containing the routing information needed to route data to the appropriate egress SAC card 212, i.e. the physical cables connecting switching shelves 200 and I/O shelves 204 of switch 108. This data is initially entered into a FI link table, described later, stored in memory of the control complex, represented by I/O shelf 204A.

The appropriate active egress SAC card 212A forwards the traffic on active egress HISL 206A to active egress FIC 218A on destination I/O shelf 204. Similarly, redundant egress SAC card 212B forwards the traffic on redundant egress HISL 206B to redundant egress FIC 218B on destination I/O shelf 204.

The fabric redundancy of switch 108 requires proper cabling of I/O shelves 204 into switching shelves 200 to provide separate active and redundant datapaths in switch 108. The arrangement of HISLs 206 connecting FICs 218 to SAC cards 212 facilitates the redundancy of switch 108 by cabling a pair of redundant FICs 218 to separate switching shelves 200A and 200B, as described earlier.

The arrangement of HISLs 206 also facilitates switching of data over redundant datapaths in the embodiment by providing a simple method of addressing packets transmitted between I/O shelves 204 and switching shelves 200. To avoid complexity in addressing in the embodiment, the arrangement of HISLs 206 connect one FI port 300(F) on FIC 218 to SAC card 212(x) on switching shelf 200A and the corresponding FI port 300(F) on the other FIC 218 of the redundant pair to SAC card 212(x) on switching shelf 200B.

The complexity avoided by providing this arrangement is illustrated in the following example. A pair of redundant FI ports 300(F), being the same numbered FI port 300(F) on a pair of redundant FICs 218, connect to a differently numbered SAC card 212 on switching shelves 200A and 200B, SAC card 212(x) on switching shelf 200A and SAC card 212(y) on switching shelf 200B where x≠y. In this situation, the packets on one stream must be addressed to leave SAC card 212(x) on switching shelf 200A and packets on the other must be addressed to leave SAC card 212(y) on switching shelf 200B to get to the appropriate destination LPCs 220.

Connections from a FIC 218 to the corresponding SAC card 212 are illustrated in I/O shelf 204C in FIG. 2. There, FIC 218 in slot 242(1) connects to SAC card 212(31) in switching shelf 200A while FIC 218 in slot 242(2) connects to SAC card 212(31) in switching shelf 200B. Similarly, FIC 218 in slot 242(3) connects to SAC card 212(32) in switching shelf 200A while FIC 218 in slot 242(4) connects to SAC card 212(32) in switching shelf 200B. It will be appreciated that a pair of redundant FI ports 300(F) in I/O shelves 204A or 204B also connect to the same numbered SAC card 212, SAC card 212(x) on both switching shelf 200A and switching shelf 200B since this arrangement routes traffic to a pair of redundant LPCs 220 from the same numbered SAC card 212(x) in switching shelves 200A and 200B.

It will be appreciated that the fully redundant system of FICs 218 requires a large number of cables to link the components, which is in the order of up to 64 HISLs 206 and up to 64 other cables between various I/O shelves 204 and switching shelves 200. This increases the complexity of configuring and cabling I/O shelves 204 together with switching shelves 200 which increases the likelihood of having a cabling error and makes it difficult for an operator to identify and correct cabling problems when they occur.

In order to check the configuration of the components and their connections in switch 108, the embodiment also tracks a logical configuration of the component and connections of switch 108, enabling a comparison to be made between the logical configuration known to switch 108 and the actual configuration detected by the switch 108. Switch 108 provides managers to report on the status of the components in fabrics as well as detect cabling problems in switch 108 to assist the operator in detecting and isolating faults in components in the fabrics and to detect and isolate problems in connecting I/O shelves 204 with switching shelves 200 that would interfere with the potential redundant datapaths provided by switch 108.

In the embodiment, link components of a fabric which are monitored by the switch 108 are grouped into a Fabric Interface (FI) link 450. FI link 450 is a logical grouping of FI port 300(F) on FIC 218, FI port 300(S) on SAC 221, HISL 206 and connection 230 for a connection between a FIC 218 and a switching fabric core 214. A FI link 450 exists comprising the active path from FIC 218 to switching core 214 and another FI link 450 exists comprising the redundant path from FIC 218 to switching core 214. FI link 450 is illustrated in FIG. 4 extending from FI port 300(F) on FIC 218 to connection 230 on switching shelves 200. Whenever switch 108 detects an operator configuration and actual cable mismatch of FI ports 300, an alarm is raised in the alarm queue and the status of FI link 450 indicates a cable mismatch. Further details on management of FI links 450 and FI ports 300 are provided below.

To manage FI links 450, the embodiment provides an FI link manager and an FI port manager. The FI link manager and FI port manager provide error reports and status information used by switch 108 to notify the operator of errors in FI links 450, such as cabling errors, and to route traffic through switch 108. The FI link manager and an FI port manager are discussed in turn.

2.0 FI Link Manager

Figure 5A:
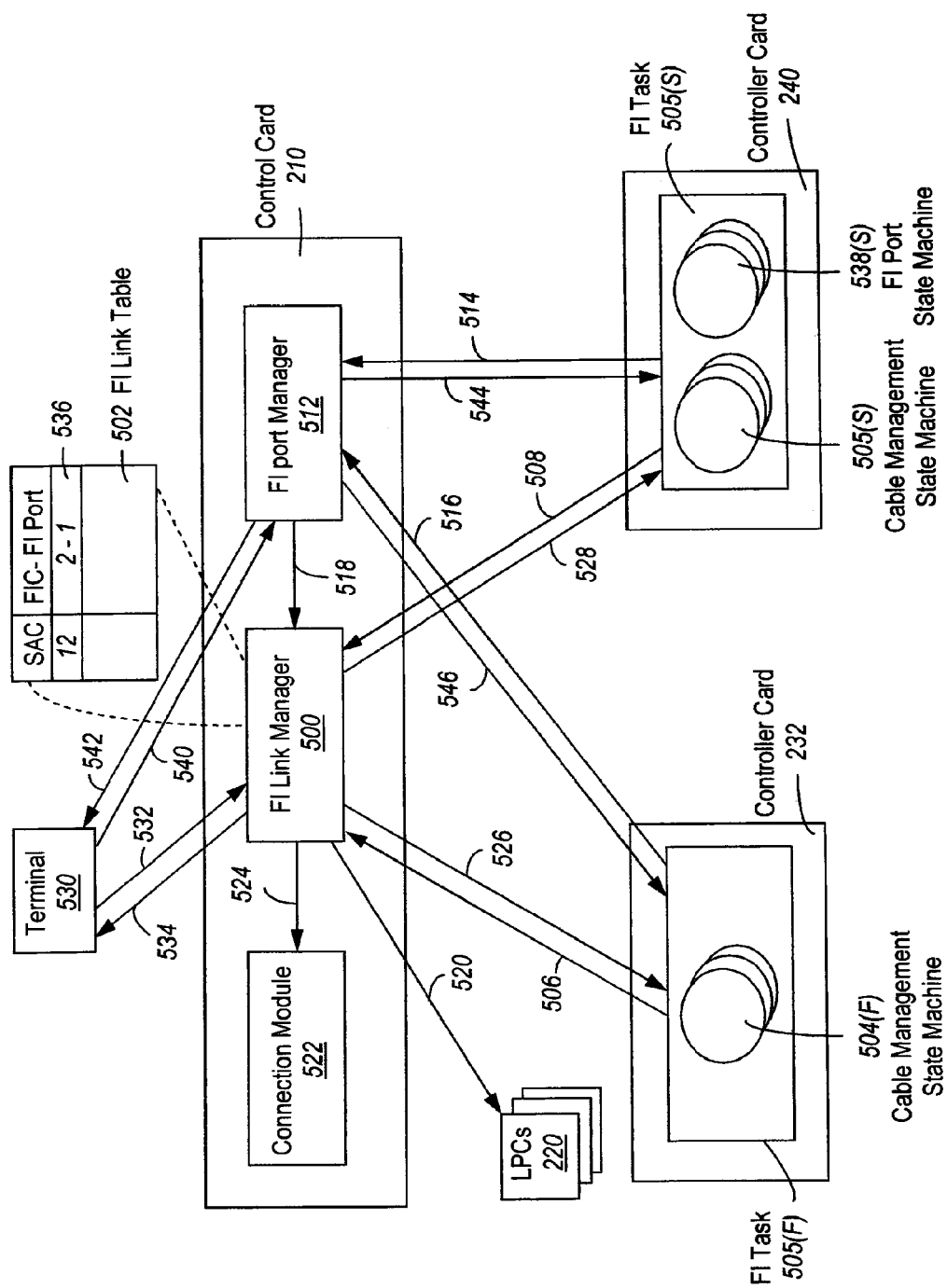
FIG. 5A is a block diagram of a management system of the fabric interface links of FIG. 4 and fabric interface ports of FIGS. 3A-3D.

Referring to FIG. 5A, switch 108 has a FI link manager 500 which monitors administrative and operational aspects of FI links 450 and assists the operator in configuring switch 108, detecting faults and dealing with alarms. FI link manager 500 is embodied in a software program executed on control card 210 on I/O shelf 204A. A method executed by FI link manager 500 is embodied in software which operates in the control complex of switch 108, represented by I/O shelf 204A. FI link manager 500 uses this software to monitor and administer FI link configuration, FI link maintenance and FI link status aggregation. FI link information, for each FI link 450, is monitored and reported to FI link manager 500 by a FI task 505 and FI Port Manager 512. FI task 505 acts as a detection module for errors associated with its associated FI link 450. Further detail on FI task 505 and FI Port Manager 512 is provided below.

Figure 5B:
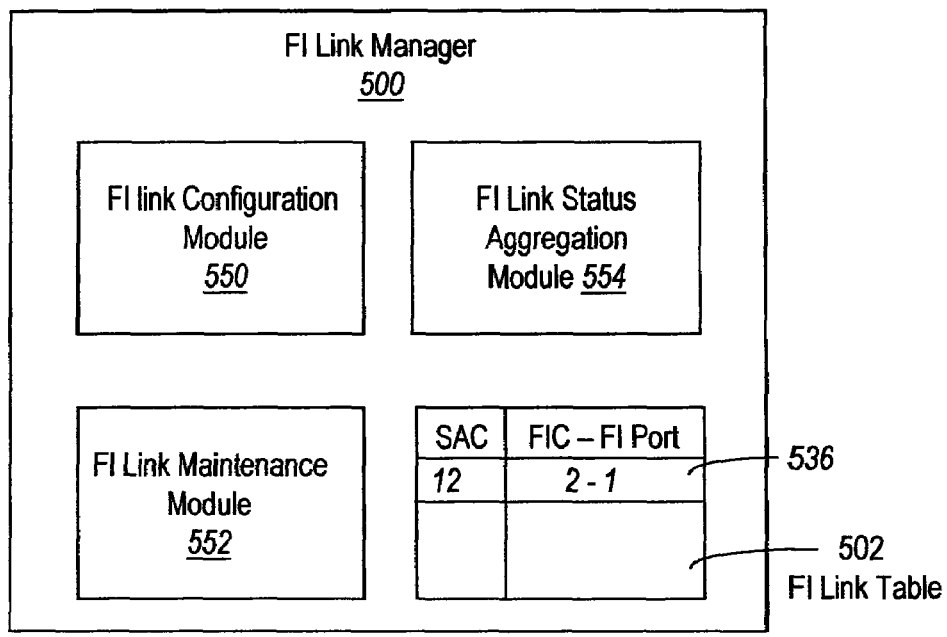
FIG. 5B is a block diagram of components of a fabric interface link manager of FIG. 5A.

Referring to FIG. 5B, FI link manager 500 has sub-modules, described below, which provide link status and configuration information to FI link manager 500. These sub-modules include FI link configuration module 550, a FI link maintenance module 552 and a FI link status aggregation module 554.

Referring again to FIG. 5A, the operator communicates with FI link manager 500 by typing in commands to command line interface (CLI) software operating on a terminal 530. The command is converted into a message which is sent to FI link manager 500, shown by arrow 532. FI link manager 500 reports errors to the operator to terminal 530, via messages as by arrow 534.

2.1 FI Link Configuration Module

In order to monitor and access FI links 450 in switch 108, FI link manager 500 manipulates and has access to a FI link table 502 stored in memory on control card 210. FI link table 502 identifies which FI ports 300(F) are assigned to each SAC port 300(S) and tracks the operational status of FI ports 300(F) and 300(S) and the cable management state machines 504, and SCI's 230 described later, at each end of HISL 206.

An operator configures FI links 450 of switch 108 through FI link configuration module 550 (FIG. 5B) of FI link manager 500 to provide FI link table 502 with connection assignments of which SAC port 300(S) connects to which FI port 300(F). Each assignment of FI port 300(F) to SAC port 300(S) must be configured as a FI link 450 before any data traffic can pass through FI link 450. FI link manager 500 transmits the topology information of FI link 450, i.e. the SAC port 300(S) to FI port 300(F) assignment, to connect module 522, via a message as by arrow 524 where it is used to route data through switch 108 and Fabric Task 505.

A FI link 450 with its assignment stored in FI link table 502 is designated by the embodiment as being configured. The assignments in switch 108 may be provided by manually entering the assignments or by having switch 108 automatically enter the assignments to FI link table 502. The operator can manually assign each SAC port 300(S) to its corresponding FI port 300(F) by typing in commands to switch 108 using the CLI software on terminal 530, shown by arrow 532. Proper FI link configuration of assignments and cables in switch 108 is required for switching between fabrics A and B for redundancy for switch 108.

Each time the operator manually makes an assignment, FI link manager 500 validates the new assignment against the HISLs 206 already physically cabled in switch 108. If there is a mismatch between the new assignment and what is cabled, an error is returned to the operator at terminal 530 and the new assignment is not stored in FI link table 502. FI link manager 500 also verifies the cabling of the corresponding SAC port 300(S) on the redundant path. If there is a mismatch between the new assignment and the cabling of its corresponding SAC port 300(S), an error is returned to the operator at terminal 530 and the new assignment is not stored in FI link table 502. If there is a match between the new assignment and what is cabled for SAC port 300(S) and the assignment matches the cabling of its corresponding SAC port 300(S), the assignment is stored in FI link table 502.

The operator may also configure FI links 450 of switch 108 before all HISLs 206 are connected between I/O shelves 204 and switching shelves 200. In this case, the assignment is checked against the corresponding SAC port 300(S) on the redundant path if the corresponding SAC port 300(S) is cabled. If the corresponding SAC port 300(S) is not yet cabled, the assignment is stored in FI link table 502.

Rather than manually entering assignments into FI link table 502, the operator may automatically store an assignment by configuring a FI link 450 "as present". "As present" indicates to FI link manager 500 that the assignment for this FI port 300(F) and SAC port 300(S) should be stored in FI link table 502 as it is cabled. For example, if the first FI port 300(F) (FI port 1) of the second FIC 218 (FIC 2) connects to the twelfth SAC card 212 (SAC 12), FI link manager 500 attempts to store the assignment shown in line 536 of FI link table 502 (SAC 12, FIC-FI port 2-1). FI link manager 500 does not store the assignment if it does not match the cabling for the corresponding SAC port 300(S). Instead, it returns an error to the operator at terminal 530, via a message as by arrow 534.

As an extension of the "as present" configuration, the operator can instruct FI link manager 500 to configure the entire switch 108 as it is cabled. This automatically stores assignments in FI link table 502 according to how switch 108 is cabled and if all SAC ports 300(S) and FIC ports 300(F) are accordingly properly configured and cabled. As with "as present", FI link manager 500 checks if cabling for a SAC port 300(S) matches that of its corresponding SAC card 212 on the redundant path, i.e. they connect to the same numbered FIC 218 and FI port 300(F). If there is a match, FI link manager 500 stores the assignment. If there is no match, FI link manager 500 does not store the assignment and it returns an error to the operator at terminal 530, shown by arrow 534.

In any of the above situations, FI link manager 500 automatically stores an assignment for its corresponding SAC port 300(S) when the operator stores an assignment for a SAC port 300(S) in FI link table 502. Also, if either the SAC port 300(S) or its corresponding SAC port 300(S) already has an assignment, FI link manager 500 returns an error to the operator and does not store the assignment in FI link table 502. It will be appreciated that there are other methods of storing assignments of the desired connections in FI link table 502.

2.2 FI Link Maintenance Module

Referring to FIG. 5B, FI link manager 500 administers the FI link maintenance module 552 of switch 108. FI links 450 have two administrative statuses: enabled or disabled. When an FI link 450 is enabled, the demerits it accumulates at any given time contribute to the overall health of the two fabrics. When an FI link 450 is disabled, any demerits it may have on one or both fabrics, is NOT factored into the health of the overall system. Thus, when the FI link 450 is disabled, maintenance operations may be performed on it, such as replacing components, without causing fabric switches in the system.

It is preferable that FI links 450 be logically disabled from FI link table 502 before physically removing its corresponding HISL 206. Physically removing HISLs 206 before logically disabling its FI link 450 may cause fabric switchovers and other alarms in switch 108.

FI links 450 are disabled by default. Disabling a previously enabled FI link 450 disables faults from being demerited to this FI link 450 from the active FI link 450 by switch 108. A switchover will not be initiated due to faults on this FI link when this FI link is disabled.

Referring again to FIG. 5A, the operator disables FI link 450 by instructing FI link manager 500 to do so via the CLI software operating on terminal 530, via a message as by arrow 532. FI link manager 500 transmits the administrative status of FI link 450, i.e. that it is disabled, back to the appropriate FI task 505(F), shown by arrow 526, and FI task 505(S), shown by arrow 528. This allows the operator to isolate FI link 450 from the system and perform port and card level diagnostics on elements associated with that FI link 450 without affecting fabric redundancy.

The operator can also enable a disabled FI link 450 by instructing FI link manager 500 to do so via the CLI software operating on terminal 530, shown by arrow 532. FI link manager 500 transmits the message that FI link 450 is enabled back to the appropriate FI task 505(F), shown by arrow 526, and FI task 505(S), shown by arrow 528. Enabling a FI link 450 allows switchover to it if the health of transmissions over the active FI link 450 warrants a switchover.

When FI link 450 is disabled, real time user data traffic is still being transmitted through switching fabric cores 214. Detaching a FI link 450 causes the FI link 450 and its SAC port 300(S) to FI port 300(F) assignment to be deleted from FI link table 502. This stops the traffic from being transmitted on FI link 450. The operator can then physically remove HISLs 206 for this FI link 450.

2.3 FI Link Status

The FI link status provides a single aggregate status report of all components of a selected FI link 450. Status information on the components is provided by FI tasks 505(F) and 505(S) and FI Port Manager 512 which report the information to FI link manager 500, shown by arrows 506 and 508 respectively. This information is used to aggregate the status of a FI link 450 in FI link status aggregation module 554 (FIG. 5B) of FI link manager 500. The collection of information from FI tasks 505(F) and 505(S) regarding the status of various components of FI links 450 is described below followed by a description of the aggregation of the FI link status.

FI tasks 505(F) manage each FI port 300(F). FI task 505(F) monitors the status of a cable management state machine 504(F) for each FI port 300(F) on an I/O shelf 204. A shelf controller card 232 operates a FI task 505(F) for each I/O shelf 204. FI tasks 505(S) manage each FI port 300(S) on switching shelf 200. FI task 505(S) monitors the status of a FI port state machine 538(S) and a cable management state machine 504(S) for each FI port 300(S) on a switching shelf 200. A switching shelf controller card 240 operates a FI task 505(S) for each switching shelf 200.

2.3.1 FI Port State Machines

FI link status aggregation module 554 receives status information regarding each FI port 300 from FI tasks 505. Internally, FI task 505(S) uses a FI port state machine 538(S)

to track and report the status of FI port 300(S). Similarly, for each FI port 300(F) on an I/O shelf 204, a FI task 505(F) uses a FI port state machine to track and report the status of FI port 300(F). In the embodiment, the FI port state machine runs on its corresponding FIC 218 and FI task 505(F) receives messages from this FI port state machine 538 regarding the status of FI port 300(F).

Figure 6:
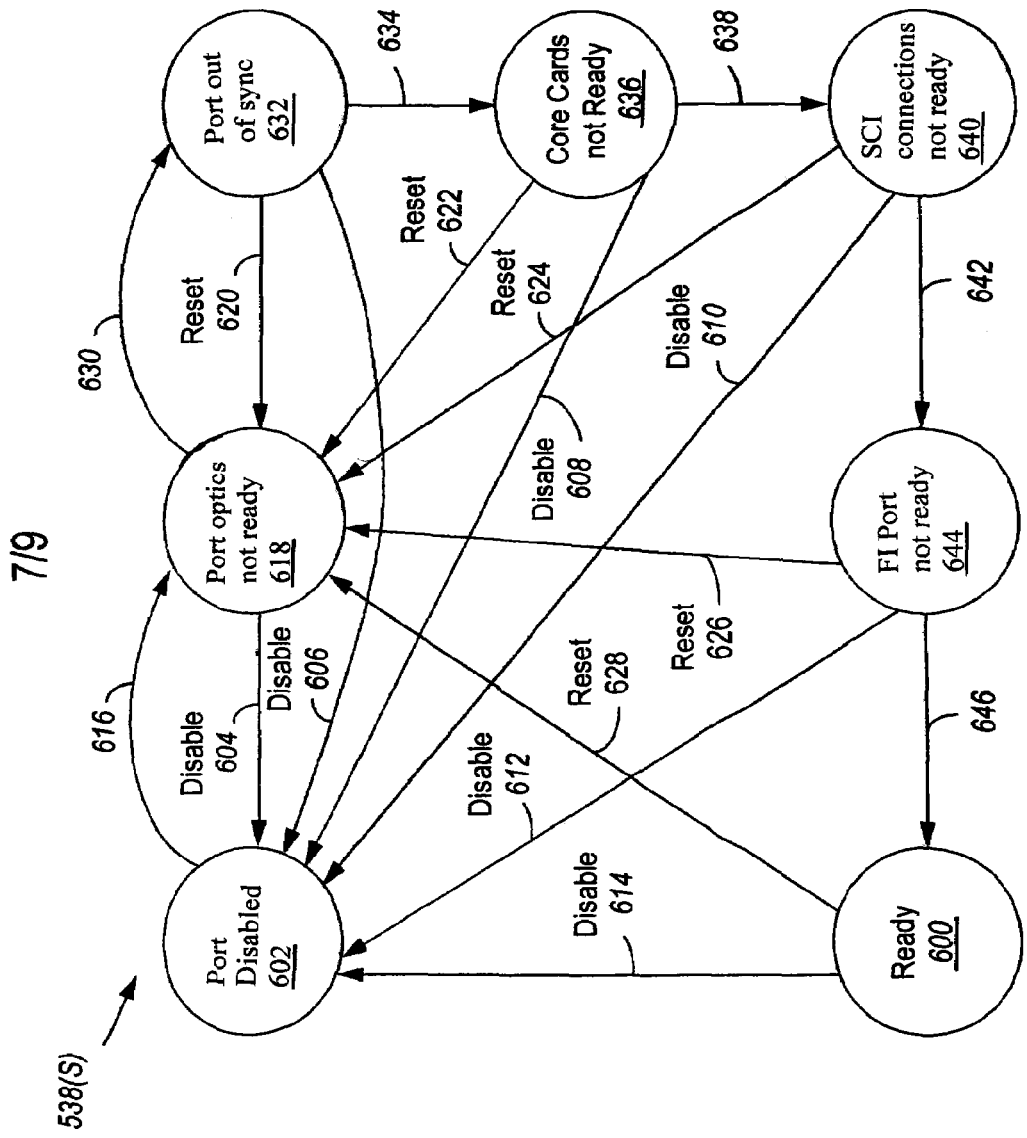
FIG. 6 is a state diagram of state transitions of a fabric interface port of FIG. 3A.

Referring to FIG. 6, FI port state machine 538(S) begins at the Port Disabled state 602 if FI port 300(S) is disabled. The operator can enable a disabled FI port 300(S) by instructing FI link manager 500 to do so via the CLI software operating on terminal 530, via a message as by arrow 532 in FIG. 5A. This is done through FI port maintenance module, described later.

Once messages are received from the FI port maintenance module that the operator has enabled FI port 300(S), FI port state machine 538(S) moves to Port Optics Not Ready state 618, indicated by arrow 616. This state is a waiting state. If FI port 300(S) is not disabled, FI port state machine 538(S) begins at Port Optics Not Ready state 618 as FI port 300(S) is enabled by default. FI port state machine 538(S) remains at Port Optics Not Ready state 618 until optical transmit link 302 and optical receive link 304 are ready. Port optics, i.e. optical transmit link 302 and optical receive link 304, are ready when they are enabled and optical transmit link 302 detects a signal from the port optics at the other end of HISL 206.

Once messages are received from FI port 300(S) that the optics of FI port 300(S) are ready, FI port state machine 538(S) moves to Port Out of Sync state 632, indicated by arrow 630. As noted previously, switching shelves 200 and I/O shelves 204, specifically FI port 300(S) and FI port 300(F), work together to ensure data from a packet divided between the twelve lines in HISL 206 arrives in the correct time period. When the data segments arrive in the correct time period, FI port 300(S) is synchronized with FI port 300(F) and FI port 300(S) generates a "synchronization complete" message.

Once the "synchronization complete" message is received, FI port state machine 538(S) moves to Core Cards Not Ready state 636, indicated by arrow 634. FI port state machine 538(S) remains at this state until SMX cards 402 and SCH 404 are ready and they generate messages to that effect. Core cards are ready when card power up diagnostics are successfully completed and they are unleased. When messages are received that the core cards are ready, switch 108 unleashes SMX cards 402 and SCH 404; also, FI port state machine 538(S) moves to SCI Connections Not Ready state 640, indicated by arrow 638. FI port state machine 538(S) remains at this state until the SCI connections in connection 230 are ready. SCI connections are ready when FI port state machine 538(S) enables the SCI connections and polls the hardware status registers to ensure they are able to transmit data. The messages generated are sent to FI port state machine 538(S) to advise of the status of the SCI connections.

When messages are received that the SCI connections in connection 230 are ready, switch 108 enables the cell scheduling on SCI connections connecting FI port 300(S) and switching fabric core 214 and FI port state machine 538(S) moves to FI Port Ingress Synchronization Not Ready state 644, indicated by arrow 642. FI port state machine 538(S) remains at this state until FI port 300(S) is ready and it updates status registers to that effect. FI ports 300(S) are ready when all device status registers are up. Ingress synchronization is achieved by the Dataslice hardware on FI port 300(S). FI port state machine 538(S) now moves to Egress synchronization Not Ready State (not shown) and stays there until Egress synch is achieved by the Dataslice hardware on FI port 300(S). When status registers indicate that FI port 300(S) is ready, switch 108 enables the FI port 300(S) and FI port state machine 538(S) moves to Ready state 600, indicated by arrow 646. Upon arriving at Ready state 600, FI task 505(S) reports to FI port manager 512 that FI port 300(S) is ready to pass data and cable management state machine 504(S) proceeds to examine whether the cabled configuration of switch 108 matches the assignments stored in FI link table 502.

At any time before reaching Ready state 600, the operator may return FI port 300(S) to Port Disabled state 602 by disabling FI port 300(S) through the FI port maintenance module. The FI port maintenance module sends a message to FI port state machine 538(S) that FI port 300 is disabled. The return paths in FIG. 6 are shown by arrows 604, 606, 608, 610 and 612 indicating a return to Port Disabled state 602.

Upon reaching the Ready state 600, the operator may still return FI port 300(S) to Port Disabled state 602, indicated by arrow 614, but this causes FI task 505(S) to report to FI port manager 512 that FI port 300(S) has a "down" status and accordingly, FI task 505(S) forces FI port 300(S) to reset. The FI port 300(S) reset also triggers events in the corresponding cable management state machine 504(S), described later.

As Port Optics Not Ready state 618 is the first step in bringing FI port 300(S) to Ready state 600, a reset of FI port 300(S) at any point before Ready state 600 returns FI port state machine 538(S) to Port Optics Not Ready state 618. The return paths are indicated by arrows 620, 622, 624 and 626. It also causes FI task 505(S) to report to FI port manager 512 that FI port 300(S) has a "down" status. At Ready state 600, a reset of FI port 300(S) returns FI port state machine 538(S) to Port Optics Not Ready state 618, indicated by arrow 628. It also causes FI task 505(S) to report to FI port manager 512 that FI port 300(S) has a "down" status and triggers events in the corresponding cable management state machine 504(S), described later.

It will be appreciated that other FI port state machines 538(S) may be implemented for other embodiments to manage the events in commissioning FI port 300(S) to Ready state 600.

In the embodiment, FI port state machines for FI ports 300(F) run on FICs 218. Fabric task 505(F) implements a messaging interface to these state machines to provide FI task 505(F) with the operational status of the FI port 300(F), optical transmit link 302 and optical receive link 304 to forward to FI port manager 512, shown by arrow 514 in FIG. 5A. As noted previously, FI port manager 512 forwards this information to FI link manager 500.

2.3.2 Cable Management State Machines

In addition to tracking the status of the port for a respective FI link 450, the embodiment tracks and verifies the cabling connecting FI ports 300(F) with FI ports 300(S). For each FI port 300(S) on a switching shelf 200, a FI task 505(S) uses a cable management state machine 504(S) to track the status of FI port 300(S) to determine whether the cabled configuration of switch 108 matches the assignments stored in FI link table 502 for FI port 300(S). Similarly, for each FI port 300(F) on an I/O shelf 204, a FI task 505(F) uses a cable management state machine 504(S) to process the events that allow FI port 300(F) to determine whether the cabled configuration of switch 108 matches the assignments stored in FI link table 502 for FI port 300(F). If cable management state machines 504(S) and 504(F) determine that there is a match, FI link 450 is configured and verified. Switch 108 can then send data over FI link 450.

When messages are received from FI port state machine 538(S) that a FI port 300(S) is at Ready state 600, cable management state machine 504(S) for FI port 300(S) begins to process the events that allow FI port 300(S) to determine whether the cabled configuration of switch 108 matches the assignments stored in FI link table 502 for FI port 300(S).

Figure 7:
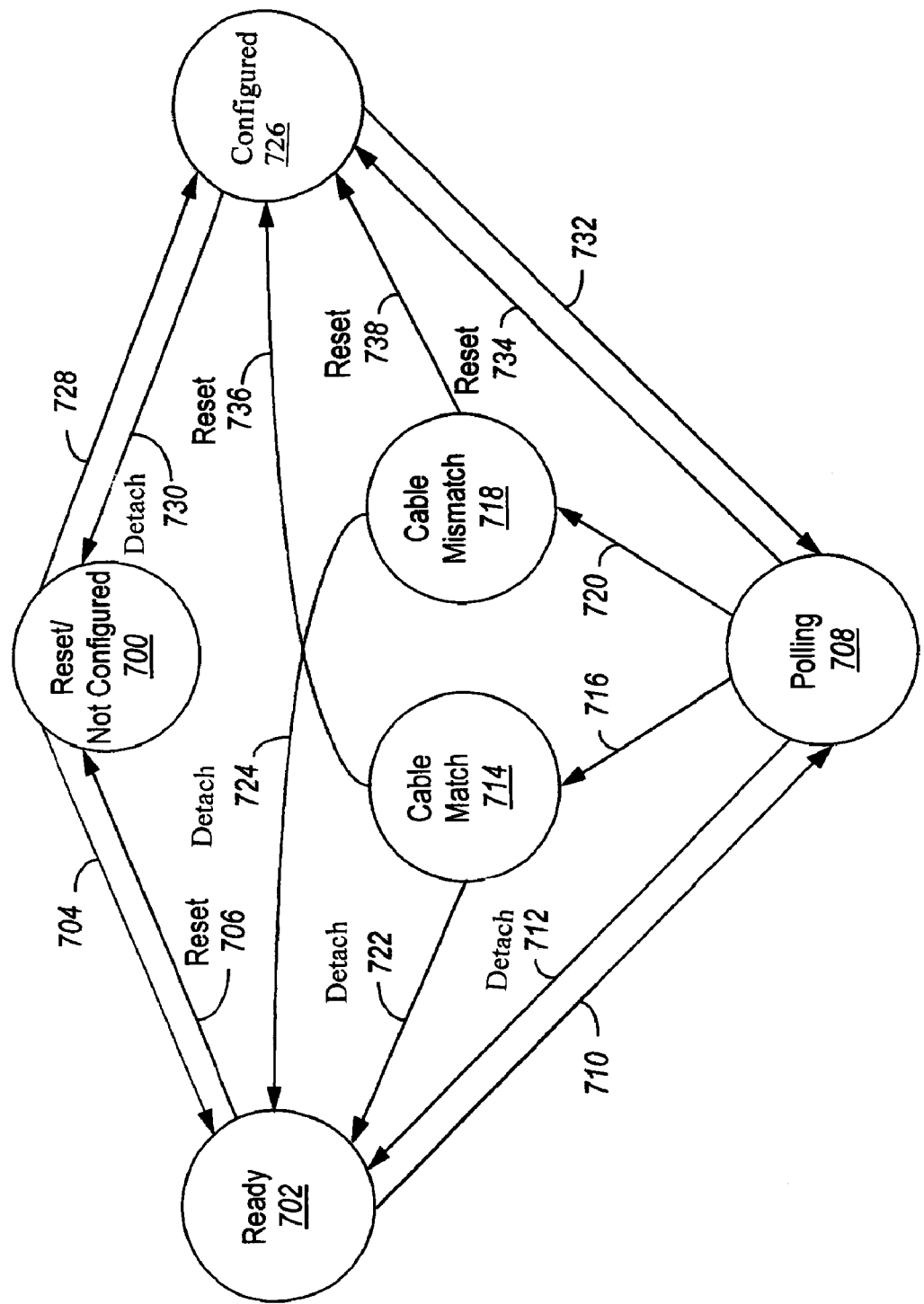
FIG. 7 is a state diagram of state transitions of a high speed intershelf link cable as monitored from a fabric interface port of FIG. 3A.

Referring to FIG. 7, cable management state machine 504(S) for FI port 300(S) is shown. If the operator has not configured switch 108 by attaching assignments between FI ports 300(F) and SAC cards 212, i.e. by entering these assignments into FI link table 502, cable management state machine 504(S) begins at Reset/Not Configured state 700. When cable management state machine 504(S) receives indication from its associated FI port state machine 538(S) that FI port 300(S) is ready, i.e. cable management state machine 504(S) is at Ready state 600, it moves to Ready state 702, indicated by arrow 704. Cable management state machine 504(S) waits at this state for its corresponding FI link 450 to be configured i.e. assignments entered into FI link table 502 for FI link 450. The configuration of FI links 450 is discussed earlier. While at Ready state 702, if FI port 300(S) is reset, cable management state machine 504(S) returns to Reset/Not Configured state 700, indicated by arrow 706.

Once messages are received from FI link manager 500 that the corresponding FI link 450 of FI port 300(S) is configured at Ready state 702, cable management state machine 504(S) moves to Polling state 708, indicated by arrow 710. If the operator detaches FI link 300(F) while cable management state machine 504(S) is at Polling state 708, cable management state machine 504(S) returns to Ready state 702, when FI port 300(S) is ready but not configured. Resetting FI port 300(S) while at Polling state 708 places cable management state machine 504(S) at Configured state 726 when FI port 300(S) is configured but not ready. While in Polling state 708, FI port 300(S) communicates with its connected FI port 300(F) to determine if the connected FI port 300(F) is the same as the assigned FI port 300(F). FI port 300(S) sends its address to its connected FI port 300(F) and receives the address of its connected FI port 300(F) back. FI task 505(S) receives the configuration information for FI port 300(S) by communicating with FI link manager 500. FI task 505(S) determines if the connected FI port 300(F) matches the assigned FI port 300(F) and provides an appropriate message to cable management state machine 504(S).

Receiving a message indicating that the connected FI port 300(F) is the same as the assigned FI port 300(F) places cable management state machine 504(S) at Cable Match state 714, indicated by arrow 716. This also causes FI task 505(S) to send a message to FI link manager 500 that there is a cable match which is aggregated into FI link status, described later. FI task 505(S) also communicates the address of the connected FI port 300(F) to FI link manager 500. FI link manager 500 stores the address of the connected FI port 300(F) in FI link table 502.

When a message indicating that the connected FI port 300(F) is not the same as the configured FI port 300(F) is received, cable management state machine 504(S) moves to Cable Mismatch state 718, indicated by arrow 720. This also causes FI task 505(S) to send a message to FI link manager 500 that there is a cable mismatch which is aggregated into FI link status, described later. FI task 505(S) also communicates the address of the connected FI port 300(F) to FI link manager 500. FI link manager 500 stores the address of the connected FI port 300(F) in FI link table 502.

While at Cable Match state 714 or Cable Mismatch state 718, the operator may detach FI link 450 which generates a message causing cable management state machine 504(S) to return to Ready state 702, indicated by arrows 722 and 724 respectively, when FI link 450 is ready but not configured. As noted previously, detaching FI link 450 causes its assignment entry to be removed from FI link table 502.

The operator may configure a FI link 450 in switch 108 before its FI port 300(S) is actually ready. If cable management state machine 504(S) has not yet received a message from FI port state machine 538(S) that its FI port 300(S) is ready, cable management state machine 504(S) begins at Reset/Not Configured state 700. The operator configures switch 108 by entering assignments between FI ports 300(F) and SAC cards 212, i.e. by entering these assignments into FI link table 502, described previously. Configuring a FI link 450 places the cable management state machine 504(S) for its corresponding FI port 300(S) at Configured state 726, indicated by arrow 728 when FI port 300(S) is configured but not ready. At Configured state 726, detaching FI link 450 places cable management state machine 504(S) back at Reset/Not Configured state 700, indicated by arrow 730.

Cable management state machine 504(S) moves from Configured state 726 to Polling state 708 when it receives a message from FI port state machine 538(S) that FI port 300(S) is ready, indicated by arrow 732. As noted previously, resetting FI port 300(S) while at Polling state 708 places cable management state machine 504(S) back at Configured state 726 when FI port 300(S) is configured but not ready. Cable management state machine 504(S) moves from Polling state 708 to Cable Match state 714 or Cable Mismatch state 718 as described previously. Resetting FI port 300(S) while at either Cable Match state 714 or Cable Mismatch state 718 returns cable management state machine 504(S) to Configured state 726, indicated by arrows 736 and 738 respectively, when FI port 300(S) is configured but not ready.

It will be appreciated that other FI port state machines 504(S) may be implemented for other embodiments to manage the events in determining if the FI port 300(F) connected to FI port 300(S) is the same as the FI port 300(F) assigned.

Cable management state machine 504(F) manages events that allow FI port 300(F) to determine whether the cabled configuration of switch 108 matches the assignments stored in FI link table 502 for FI port 300(F). As noted previously, if cable management state machines 504(S) and 504(F) determine that there is a match, FI link 450 is properly configured and verified. When a FI port 300(S) is ready, cable management state machine 504(F) for FI port 300(F) begins execution.

Figure 8:
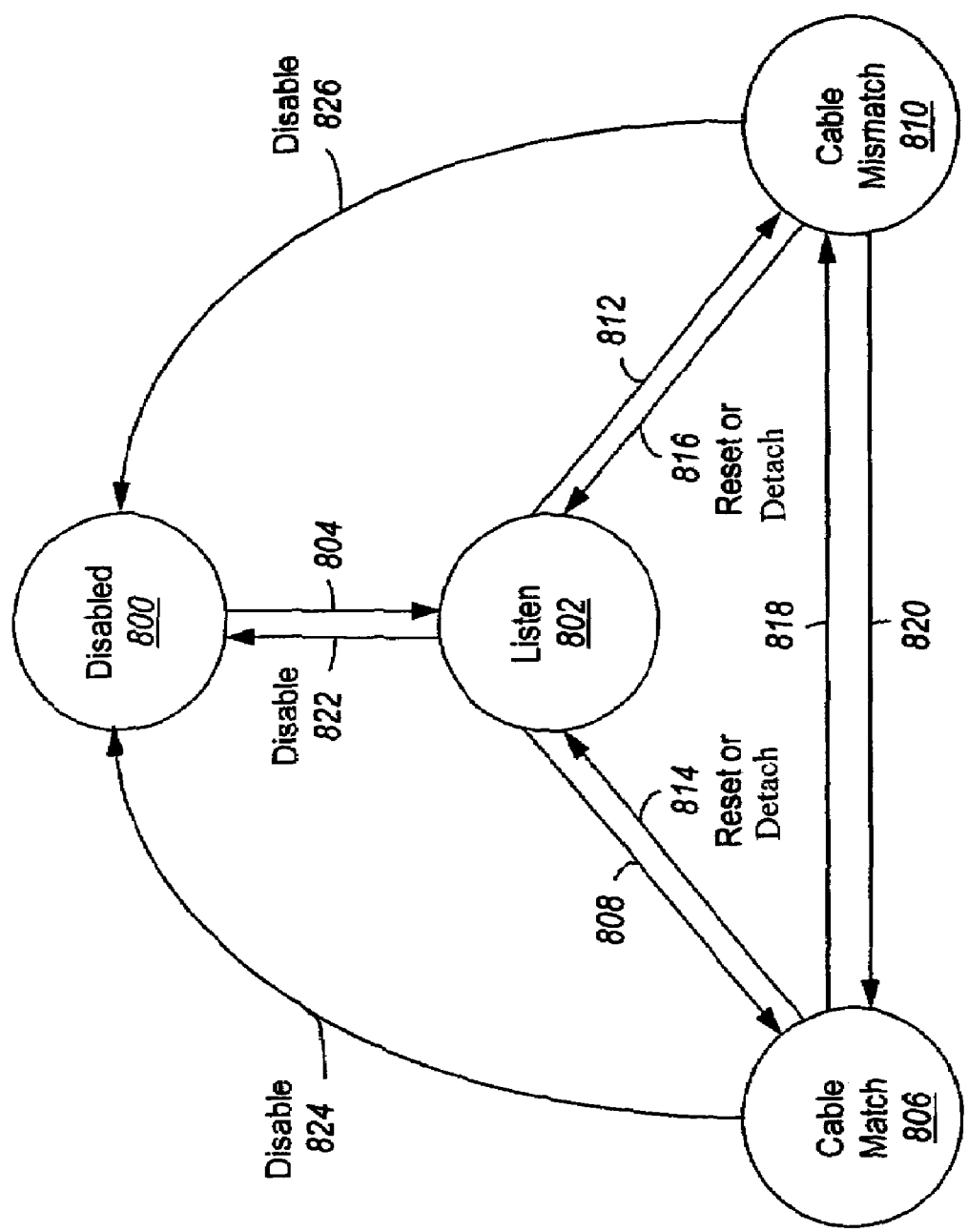
FIG. 8 is a state diagram of state transitions of a high speed intershelf link cable as monitored from a fabric interface port of FIGS. 3B-3D.

Referring to FIG. 8, cable management state machine 504(F) for FI port 300(F) is shown. Cable management state machine 504(F) begins at the Port Disabled state 800 if FI port 300(F) is disabled. Enabling FI port 300(F) places cable management state machine 504(F) at Listen state 802, indicated by arrow 804. If FI port 300(F) is not disabled, cable management state machine 504(F) begins at Listen state 802 as FI port 300(F) is enabled by default. An operator may enable and disable a FI port 300(F) using the FI port maintenance module 562, described later.

At Listen state 802, FI port 300(F) monitors for packets arriving from its connected FI port 300(S) which FI port 300(S) sends out during Polling state 708 in FIG. 7. These packets indicate the address of the connected FI port 300(S).

FI port 300(F) sends its address to its connected FI port 300(S) in response. FI task 505(F) determines if the connected FI port 300(S) matches the assigned FI port 300(S) and provides an appropriate message to cable management state machine 504(F).

If messages are received indicating that the connected FI port 300(S) matches the assigned FI port 300(S), cable management state machine 504(F) moves to Cable Match state 806, indicated by arrow 808. This also causes FI task 505(F) to send a message to FI link manager 500 indicating that there is a cable match. The cable match message is aggregated into FI link status which is described in detail later. FI task 505(F) also communicates the address of the connected FI port 300(S) to FI link manager 500. FI link manager 500 stores the address of the connected FI port 300(S) in table 502.

If messages are received indicating that the connected FI port 300(S) does not match the assigned FI port 300(S), cable management state machine 504(F) moves to Cable Mismatch state 810, indicated by arrow 812. This also causes FI task 505(F) to send a message to FI link manager 500 that there is a cable mismatch which is aggregated into FI link status, described later. FI task 505(F) also communicates the address of the connected FI port 300(S) to FI link manager 500. FI link manager 500 stores the address of the connected FI port 300(S) in table 502.

If the connected FI port 300(F) is not configured when the packets from FI port 300(S) are received, cable management state machine 504(F) remains at Listen state 802 until messages are received indicating that FI port 300(F) is configured.

Resetting FI port 300(F) or detaching the assignment for FI port 300(F) while in Cable Match state 806 or Cable Mismatch state 810 returns cable management state machine 504(F) to Listen state 802, indicated by arrows 814 and 816 respectively. This also causes FI task 505(F) to send a message to FI link manager 500 that FI link 450 should have a "down" status.

Additionally, elements in switch 108 may periodically check FI link 450 to determine that it is configured properly. If the operator has recabled or reconfigured switch 108 without disabling FI port 300(F), this check may reveal that a cable mismatch exists. If cable management state machine 504(F) was in Cable Match state 806, cable management state machine 504(F) moves from Cable Match state 806 to Cable Mismatch state 810, indicated by arrow 818. This also causes FI task 505(F) to send a message to FI link manager 500 indicating that there is a cable mismatch. The cable mismatch indication is aggregated into FI link status, which is described later in detail. FI task 505(F) also communicates the address of the connected FI port 300(S) to FI link manager 500. FI link manager 500 stores the address of the connected FI port 300(S) in FI link table 502.

Similarly, if the operator has recabled or reconfigured switch 108 without resetting or detaching FI port 300(F), the check may reveal a new cable match between the FI port 300(S) connected to FI port 300(F) and that assigned to FI port 300(F). If cable management state machine 504(F) was in Cable Mismatch state 810, cable management state machine 504(F) moves from Cable Mismatch state 810 to Cable Match state 806, indicated by arrow 820. This also causes FI task 505(F) to send a message to FI link manager 500 that there is a cable match and indicates the address of the connected FI port 300(S). FI link manager 500 stores the address of the connected FI port 300(S) in FI link table 502.

The operator can disable FI port 300(F) using the FI port maintenance module, described later. Disabling FI port 300(F) while cable management state machine 504(F) is in Listen state 802 or Cable Mismatch state 810 returns it to Port Disable state 800, indicated by arrows 822 and 826 respectively. Disabling FI port 300(F) while in Cable Match state 806 returns cable management state machine 504(F) to Port Disable state 800, indicated by arrow 824. This also causes FI task 505(F) to send a message to FI link manager 500 that FI link 450 should have a "down" status.

It will be appreciated that other FI port state machines 504(F) may be implemented for other embodiments to manage the events in determining if the FI port 300(S) connected to FI port 300(F) is the same as the FI port 300(S) assigned.

2.3.3 FI Link Status Aggregation Module

Referring again to FIG. 5A, FI tasks 505(F) and 505(S) report the status of cable management state machines 504(F) and 504(S) to FI link manager 500, shown by arrows 506 and 508 respectively. FI tasks 505(S) also report the status of FI port state machines 538(S) to FI port manager 512, shown by arrow 514. FI port manager 512, described later, reports the status of FI ports 300 to FI link manager 500, shown by arrow 516. FI link manager 500 provides a FI link status aggregation module 554 (FIG. 5B) to aggregate all of the above statuses to produce an operational status of each FI link 450. FI link manager 500 transmits the operational status of each FI link 450 on the active fabric to LPCs 220, shown by arrow 520.

In the embodiment, FI link 450 may have the following operational statuses: "unknown", "cable mismatch", "problem", "down" and "ok".

"Unknown" status report indicates that one or more components of FI link 450 are not communicating with FI link manager 500. If the previous status report of FI link 450 was "ok" or "problem", LPCs 220 continues to send traffic through FI link 450 in spite of the "unknown" status report.

A status report of "cable mismatch" indicates a cable mismatch as identified by cable management state machines 504.

A status report of "problem" indicates that errors were found on FI link 450. With this status report, no action is taken by FI link manager 500 as fabric redundancy chooses the healthiest fabric. Errors causing a "problem" status report may include a loss of signal, the signal being out of sync, persistent 8B/10B decoding errors, persistent parity errors, or persistent cyclic redundancy check errors. This list of faults cause a "problem" status and a FI port reset is executed to attempt to resolve the fault on the link as described later. Errors causing a "problem" status are: non-persistent parity errors and non-persistent cyclic redundancy errors. Each is described in turn.

FI link 450 detects a loss of signal at optical receive link 304 in FI port 300. This condition is detected by FI task 505 and reported to FI port manager 512 which in turn reports to FI link manager 500. FI link 450 detects that the signal received from HISL 206 is out of sync when it receives control cells indicating the far end FI port 300 is not ready. This indicates that the far end FI port 300 is not synchronized.

Data is converted from an 8 bit format to a 10 bit format (8B/10B) for transmitting packets across HISL 206 to keep an appropriate bit density enabling optical devices in FI link 450 to operate correctly. Switch 108 may detect errors in the data after converting it from the 10 bit format back to the 8 bit format. FI link 450 detects persistent 8B/10B decoding errors using hardware device status registers. Interrupts are sent from the hardware to the software which responds by reading these device status registers to detect the problem being reported by the hardware. Parity errors may occur at a number of places in FI link 450 as data may be corrupted. Parity checks are only detected inside of memory devices. FI link 450 detects persistent parity errors by performing a parity check when hardware reads or writes to memory. If the parity check fails, hardware will report the problem as with 8B/10B decoding errors, described above. Cyclic redundancy check errors may occur at a number of places in FI link 450 and may be caused by faulty hardware and bent or bad HISL cables, among other things. FI link 450 detects persistent cyclic redundancy check errors and reports them as with 8B/10B decoding errors, described above. A "problem" status report indicates that FI link 450 is losing data because corrupted cells are detected. This status report informs the operator of the need to investigate the nature of the packet losses.

A "down" status report for any component of FI link 450 results in a "down" status report for FI link 450. A "down" status report may indicate a failure along FI link 450 or can be caused by a disabled FI port 300 or a disabled optical transmit link 302 or optical receive link 304. FI link manager 500 informs LPCs 220 of the "down" status report which may cause it to transmit operations, administration and maintenance (OAM) packets to all of its FI ports 300(F).

An "ok" status report indicates that FI link 450 is functioning properly and can transmit and receive data thereon.

When the operational status of a FI link 450 transitions to "ok" or "down", FI link manager 500 debounces the signal to eliminate spurious trigger signals. At the end of the debounce period, if the status of FI link 450 has not changed, the active fabric has not changed and the FI link 450 is on the active fabric, FI link manager 500 reports the status change to LPCs 220, as shown by arrow 520 in FIG. 5A. LPCs 220 may begin to send out OAM packets or stop sending out OAM packets in response to the status change.

If the status of FI link 450 or the active fabric changes during he debounce period, the debounce is restarted. In the embodiment, the debounce period is 200 ms for a transition to "down" and 500 ms for a transition to "ok".

3.0 FI Port Manager

In addition to providing reports on the status of FI links 450, the embodiment also reports to an operator the status of the various FI ports 300 and their components. This is performed by FI port manager 512. Referring again to FIG. 5A, FI port manager 512 provides the operator with status information regarding FI ports 300(F) and 300(S) via switch control software operating on terminal 530, indicated by arrow 542. The operator can communicate with FI port manager 512 through software operating on terminal 530, indicated by arrow 540.

Figure 5C:
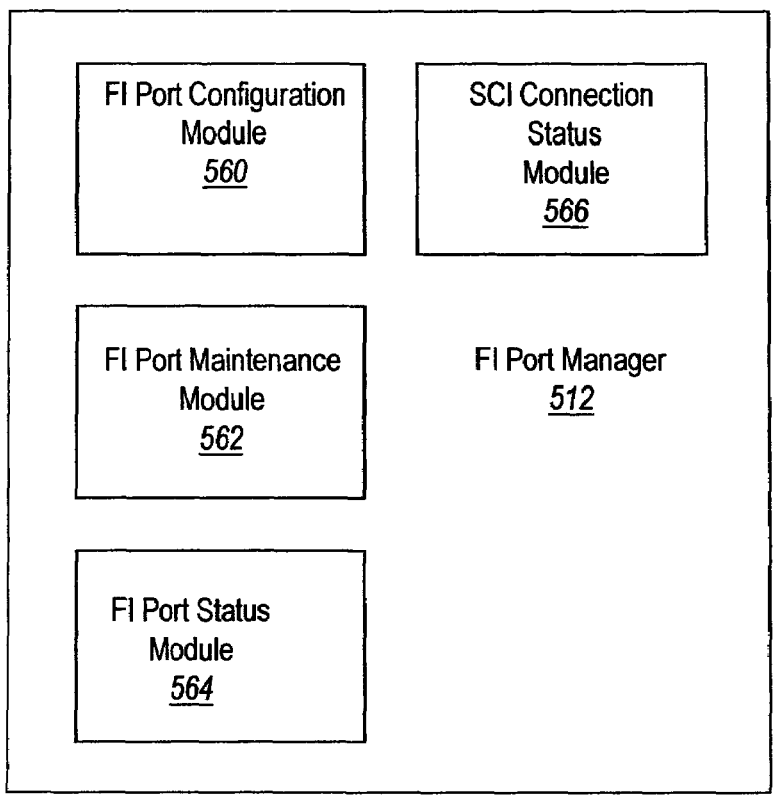
FIG. 5C is a block diagram of components of a fabric interface port manager of FIG. 5A.

Referring to FIG. 5C, the information provided by FI port manager 512 assists the operator with the administration and operation of FI ports 300(F) and 300(S) by providing a FI port configuration module 560, a FI port maintenance module 562, a FI port status module 564 and a SCI connection status module 566.

3.1 FI Port Configuration Module

Referring again to FIG. 5A, the FI port configuration module 560 (FIG. 5C) of FI port manager 512 of FI port 300 allows the operator to name FI port 300 with a custom label through software operating on terminal 530, indicated by arrow 540.

3.2 FI Port Maintenance Module

The FI port maintenance module 562 (FIG. 5C) allows the operator to disable a particular FI port 300 or a component of a FI port 300 to perform maintenance on it without tripping unnecessary alarms. Accordingly, the FI port 300, optical transmit link 302 and optical receive link 304 can each be enabled or disabled and the FI port 300 can be reset separately from each other. The operator communicates with FI port manager 512 through software operating on terminal 530, indicated by arrow 540, to disable and enable FI ports 300 and their components.

FI ports 300 are enabled by default. Disabling FI port 300(F) suspends all alarms for that FI port 300(F) and disables optical transmit link 302 and optical receive link 304. Disabling FI port 300(S) suspends all alarms for that FI port 300(S), disables optical transmit link 302 and optical receive link 304 and disables SCI connections for that FI port 300(S).

Because disabling FI port 300 disables optical transmit link 302 and optical receive link 304, its corresponding FI port 300 on the other end of HISL 206 reports a loss of signal at optical receive link 304 to FI port manager 512. FI link status is "down" if one of its FI ports 300(S) or 300(F) is disabled.

Enabling FI port 300(F) also enables its optical transmit link 302 and optical receive link 304. Enabling FI port 300(S) also enables its optical transmit link 302, optical receive link 304 and SCI connections. When FI port 300 is enabled, its FI task 505 attempts to bring FI port 300 to ready status and verify assignments for its FI link 450.

Optical transmit link 302 and optical receive link 304 are enabled by default. If the optical transmit link 302 of the corresponding FI port 300 on the other end of HISL 206 fails, optical receive link 304 at FI port 300 reports a loss of signal to FI port manager 512.

When an operator disables optical transmit link 302 and optical receive link 304, FI port 300 reports this condition to FI port manager 512. Additionally, disabling optical transmit link 302 on FI port 300 causes the optical receive link 304 of its corresponding FI port 300 on the other end of HISL 206 to report a loss of signal to FI port manager 512. When optical transmit link 302 and optical receive link 304 of FI port 300 are enabled, FI task 505 attempts to bring FI port 300 to ready status and verify assignments for its FI link 450.

Resetting FI port 300 clears any outstanding alarms on FI port 300. Then, FI task 505 again attempts to bring FI port 300 to ready status and verify assignments for its FI link 450. Resets are manually operated through terminal 530 or automatically triggered by FI tasks 505, as is described later. For a FI port 300(S), its corresponding FI task 505(S) provides a utility function for disabling all SCI connections to prevent any corrupted data from flowing into switching fabric core 214 when resetting FI port 300(S). A reset also masks alarms raised by cards in switching fabric core 214 indicating that SCI connections are disabled.

A reset of FI port 300(F) does not disable optical transmit link 302 or optical receive link 304 and so the optical receive link 304 at its corresponding FI port 300 at the other end of HISL 206 does not report a loss of signal. A reset of FI port 300(S) causes a loss of signal at FI port 300(F). After resetting FI port 300, FI task 505 attempts to bring FI port 300 to ready status and verify assignments for its FI link 450.

3.3 FI Port Status Module

FI port manager 512 provides a FI port status module 564 (FIG. 5C) to aggregate the status of FI ports 300. FI tasks 505(F) and 505(S) forward the operational status of their FI port 300 and the operational status of their optical transmit link 302 and their optical receive link 304 to FI port manager 512 to be aggregated, shown by arrows 514 and 516 respectively. Monitoring the status of FI ports 300(S) also includes monitoring the status of SCI connections in a connection 230 connecting SAC card 212 to switching fabric core 214 so FI tasks 505(S) forward the operational status of SCI connections in connections 230 to FI port manager 512 to be aggregated, shown by arrow 516. FI port manager 512 reports these statuses to FI link manager 500, shown by arrow 518.

The aggregate status of FI port 300 and only the most serious error, indicated by the status of FI port 300, is reported to the operator at terminal 530, shown by arrow 542. This provides a prioritized error report to the operator. The possible statuses for FI port 300, in order of decreasing severity, include: "unknown", "loss of signal", "loss of clock", "persistent 8B/10B decoding errors", "persistent parity errors", "ingress queue overflow", "egress queue overflow", "persistent cyclic redundancy check errors", "out of sync" and "ok".

"Unknown" status indicates that shelf control card 232 is not communicating with FIC 218 or the control complex, represented by I/O shelf 204A, is not communicating with I/O shelf 204 associated with FI port 300(F) or the control complex is not communicating with switching shelf 200 associated with FI port 300(S).

"Loss of signal" status indicates a problem at the physical layer in detecting a signal from the optical transmit link 302 at the other end of HISL 206. This status report is also generated if one of the optical transmit link 302 or the optical receive link 304 is not functioning, resulting in a "loss of signal" status for both the FI port 300 experiencing the problem and its corresponding FI link 400 at the other end of HISL 206. "Loss of signal" at one FI port 300 may indicate a physical problem with HISL 206, for example if HISL 206 is broken or flexed beyond its operating tolerances.

"Loss of clock" status report is only used for FI ports 300(F). This status report occurs when FI port 300(F) detects a missing edge on its input clock indicating that FI port 300(F) may have hardware problems and its FIC 218 should be replaced.

"Out of sync" status report indicates a packet synchronization error. As noted previously, FI port 300(F) and its corresponding FI port 300(S) acquire packet synchronization by detecting consecutive control packets. This status report occurs when the control sequences of the control packets is out of sync. FI task 505 automatically resets a FI port 300 if it has an "out of sync" status as described later.

"Persistent 8B/10B decoding errors" status report indicates that errors in the data were detected when converting the data from a 10 bit format back to an 8 bit format. This status report could indicate a fault in HISL 206, optical receive link 304 on FI port 300 or optical transmit link 302 on its corresponding FI port 300, among other things. This status report requires further investigation by the operator.

"Persistent parity errors" status report is only used for FI ports 300(F). This status report indicates that persistent parity errors in the queues in FI port 300(F) were detected. A FI port 300(F) reporting this status report may have hardware problems and its FIC 218 should be replaced.

"Ingress queue overflow" status report indicates that FI port 300 attempted to push a packet into an ingress queue or FIFO when the queue was full. This may require the operator to reset FI port 300 or replace FIC 218 or SAC card 212.

"Egress queue overflow" status report indicates that FI port 300 attempted to push a packet into an egress queue or FIFO when the queue was full. This may require the operator to replace FIC 218 or SAC card 212.

"Persistent cyclic redundancy check errors" status report indicates that persistent cell corruption errors are occurring in data transmitted through FI port 300. This status report requires further investigation by the operator to isolate the problems in FI link 450.

"Ok" status report indicates that FI port 300 is operational and error free.

3.4 SCI Connection Status Module

Although FI port status module 564 (FIG. 5C) aggregates the SCI connection status, the SCI connection status is also separately reported by FI port manager 512 to terminal 530, shown by arrow 542. The SCI connection status module 566 (FIG. 5C) of FI port manager 512 allows the operator to separately monitor SCI connections for errors. The SCI status is reported on a per FI port 300(S) basis for each SCI connection in connection 230. The possible statuses for SCI connections include: "unknown", "persistent cyclic redundancy check errors", "down" and "ok".

"Unknown" status report indicates that the control complex, represented by I/O shelf 204A, is not communicating with switching shelf 200 associated with FI port 300(S) or that switching shelf controller card 240 is not communicating with the SAC card 212 associated with the SCI connection.

"Persistent cyclic redundancy check errors" status report indicates that persistent cell corruption errors are occurring in packets flowing through SCI connections. This status report requires further investigation by the operator to isolate the problems in FI link 450.

"Down" status report indicates that the SCI connection and FI port 300 are disabled, SCI connection and FI port 300 are not configured, SAC port 300(S) associated with the SCI connection is not installed or the start-up diagnostics for FI port 300 have failed.

"Ok" status report indicates that the SCI connection is operational and error free.

4.0 FI Port LED Module

Management of FI ports 300 includes FI port LEDs which are operated by FI tasks 505(S) and 505(F). FI tasks 505(F) operate the activity LED for each FIC 218 on I/O shelf 204 while FI tasks 505(S) operate the activity LED for each SAC card 212 on switching shelves 204. FI port LEDs provide the operator with visual indications about the status of the individual optical devices in FI port 300.

Each FI port 300 has two tri-color LEDs (red, green, yellow). One LED is associated with optical transmit link 302 and the other with optical receive link 304. In the embodiment, optical transmit link 302 is tied to optical receive link 304 so that they are both operable or both not operable i.e. a fault or disabling of one optical device results in failure or disabling of the other. Therefore the LEDs for optical transmit link 302 and optical receive link 304 are the same in the embodiment. It will be appreciated that other embodiments may separately enable and disable optical transmit link 302 and optical receive link 304 and a fault in one does not result in failure of the other optical device.

Solid green on both LEDs indicates a fully operational state for optical transmit link 302 and optical receive link 304. Any other color for the LEDs, including off or flashing green, indicates problems with FI port 300 and must be investigated by the operator. For example, a cable mismatch in the embodiment is indicated by LEDs flashing between green and red on FI port 300 that detected the mismatch.

5.0 Automatic Reset

FI tasks 505, as well as communicating with FI link manager 500 and FI port manager 512, may also trigger an automatic reset of FI port 300 in response to problems detected on FI port 300. FI tasks 505 trigger this reset independently of FI link manager 500 and FI port manager 512.

Errors reported to a FI task 505 are characterized as FI link errors or data errors. FI task 505 reports both types of errors to FI port manager 512 which aggregates the status of FI port 300 based on this information. A FI link error additionally triggers FI task 505 to reset its corresponding FI port 300. FI link errors include: ingress queue overflow, egress queue overflow, optical transmit link 302 down, optical receive link 304 down, persistent 8B/10B decoding errors, SCI connection down, loss of clock, and FI port 300 out of sync with its corresponding FI port 300, among other errors.

Triggering an automatic reset attempts to clear the detected error by restarting transmission over HISL 206.

6.0 Operator Action

As noted previously, FI link manager 500 and FI port manager 512 aggregate the status of each FI link 450 and each FI port 300. They also send alarms to terminal 530 to indicate problems with a FI link 450 or a FI port 300, FI port manager 512 also administers LEDs on each FI port 300 to provide a visual indication of problems. The operator uses the information gathered by FI link manager 500 and FI port manager 512 to isolate errors and faults in FI link 450 and FI port 300.

It is noted that those skilled in the art will appreciate that various modifications of detail may be made to the present embodiment, all of which would come within the scope of the invention.

We claim:

1. A system for managing communication links connecting components in a network element, said network element including a first component, a second component and a fabric interface link coupling said first component and said second component, said fabric interface link including a first fabric interface port in said first component coupled by a high speed inter-shelf link to a second fabric interface port in said second component, said system comprising:
   a first detection module associated with said first component for generating a first status message for reporting an operational state of said first fabric interface port;
   a second detection module associated with said second component for generating a second status message for reporting an operational state of said second fabric interface port;
   a third detection module associated with said first component for generating a third status message for reporting a connection state of said high speed inter-shelf link to said first fabric interface port;
   a fourth detection module associated with said second component for generating a fourth status message for reporting a connection state of said high speed inter-shelf link to said second fabric interface port; and,
   a collection module for aggregating said first, second, third, and fourth status messages to generate a single aggregate status report indicating an operational state for said fabric interface link.

2. The system of claim 1, wherein said status report is for use in choosing between an active and a redundant datapath connection between said first component and said second component.

3. The system of claim 2, wherein said network element utilizes said status report to select a datapath route from among a plurality of fabric interface links.

4. The system of claim 3, wherein:
   said first detection module includes a first fabric interface port state machine for generating said first status message;
   said second detection module includes a second fabric interface port state machine for generating said second status message;
   said third detection module includes a first cable management state machine for generating said third status message; and,
   said fourth detection module includes a second cable management state machine for generating said fourth status message.

5. The system of claim 4, said system further comprising:
   a configuration module communicating with said first, second, third, and fourth detection modules, said configuration module storing a configuration record for said fabric interface link, wherein:
   said third detection module communicates with said configuration module to determine whether an error relating to said configuration record exists with respect to connection of said high speed inter-shelf link to said first fabric interface port; and
   said fourth detection module communicates with said configuration module to determine whether an error relating to said configuration record exists with respect to connection of said high speed inter-shelf link to said second fabric interface port.

6. The system of claim 5, wherein:
   said configuration module stores a first assigned identity for said first fabric interface port and a second assigned identity for said second fabric interface port;
   said third detection module compares a second connected identity of said second fabric interface port to said second assigned identity and, when said second connected identity does not match said second assigned identity, signals a cabling error; and
   said fourth detection module compares a first connected identity of said first fabric interface port to said first assigned identity and, when said first connected identity does not match said first assigned identity, signals a cabling error.

7. The system of claim 6, wherein said network element includes a plurality of shelves, wherein said first component is an input/output shelf, and wherein said second component is a switching shelf.

8. The system of claim 7, wherein:
   said input/output shelf includes a line processing card and a fabric interface card including said first fabric interface port for accessing said line processing card;
   said switching shelf includes a switching fabric core and a switch access card including said second fabric interface port for accessing said switching fabric core; and
   said second detection module monitors connections between said switch access card and said switching fabric core.

9. The system of claim 8, wherein said high speed inter-shelf link is at least one fibre optic cable including a transmit fibre and a receive fibre.

10. The system of claim 1, wherein at least one of said first, second, third, and fourth detection modules selectively resets said fabric interface link upon detection of an error.

11. A system for managing a communication link connecting components in a multi-shelf network element, said multi-shelf network element including a first shelf, a second shelf and a fabric interface link coupling said first shelf and said second shelf, said fabric interface link including a first fabric interface port in said first self coupled by a high speed inter-shelf link to a second fabric interface port in said second shelf, said system comprising:
 a first detection module associated with said first shelf for generating a first status message for reporting an operational state of said first fabric interface port;
 a second detection module associated with said second shelf for generating a second status message for reporting an operational state of said second fabric interface port;
 a third detection module associated with said first shelf for generating a third status message for reporting a connection state of said high speed inter-shelf link to said first fabric interface port;
 a fourth detection module associated with said second shelf for generating a fourth status message for reporting a connection state of said high speed inter-shelf link to said second fabric interface port; and,
 a collection module for aggregating said first, second, third, and fourth status messages to generate a single aggregate status report indicating an operational state for said fabric interface link.

12. The system of claim 11, wherein said first shelf is an input/output shelf and said second shelf is a switching shelf.

13. The system of claim 11, wherein at least one of said first, second, third, and fourth detection modules selectively resets said fabric interface link upon detection of an error.

14. A method for managing communication links connecting components in a network element, said network element including a first component, a second component and a fabric interface link coupling said first component and said second component, said fabric interface link including a first fabric interface port in said first component coupled by a high speed inter-shelf link to a second fabric interface port in said second component, said method comprising:
 generating with a first detection module associated with said first component, a first status message for reporting an operational state of said first fabric interface port;
 generating with a second detection module associated with said second component, a second status message for reporting an operational state of said second fabric interface port;
 generating with a third detection module associated with said first component, a third status message for reporting a connection state of said high speed inter-shelf link to said first fabric interface port;
 generating with a fourth detection module associated with said second component, a fourth status message for reporting a connection state of said high speed inter-shelf link to said second fabric interface port; and,
 aggregating with a collection module, said first, second, third, and fourth status messages to generate a single aggregate status report indicating an operational state for said fabric interface link.

15. The method of claim 14, wherein status report is for use in choosing between an active datapath and a redundant datapath connection between said first component and said second component.

16. The method of claim 15, wherein said network element utilizes said status report to select a datapath route from among a plurality of fabric interface links.

17. The method of claim 16, wherein:
 said first detection module includes a first fabric interface port state machine for generating said first status message;
 said second detection module includes a second fabric interface port state machine for generating said second status message;
 said third detection module includes a first cable management state machine for generating said third status message; and,
 said fourth detection module includes a second cable management state machine for generating said fourth status message.

18. The method of claim 17, wherein:
 a configuration module communicating with said first, second, third, and fourth detection modules stores a configuration record for said fabric interface link;
 said third detection module determines whether an error relating to said configuration record exists with respect to connection of said high speed inter-shelf link to said first fabric interface port; and
 said fourth diction module determines whether an error relating to said configuration record exists with respect to connection of said high speed inter-self link to said second fabric interface port.

19. The method of claim 18, wherein:
 said configuration record stores a first assigned identity for said first fabric interface port and a second assigned identity for said second fabric interface port;
 said third detection module compares a second connected identity of said second fabric interface to said second assigned identity and, when said second connected identity does not match said second assigned identity, signals a cabling error; and
 said fourth detection module compares a first connected identity of said first fabric interface port to said first assigned identity and, when said first connected identity does not match said first assigned identity, signals a cabling error.

20. The method of claim 19, wherein said network element includes a plurality of shelves, wherein said first component is an input/output shelf, and wherein said second component is a switching shelf.

21. The method of claim 20, wherein:
 said input/output shelf includes a line processing card and a fabric interface card including said first fabric interface port for accessing said line processing card;
 said switching shelf includes a switching fabric core and a switch access card including said second fabric interface port for accessing said switching fabric core; and
 said second detection module monitors connections between said switch access card and said switching fabric core.

22. The method of claim 21, wherein said high speed inter-shelf link is at least one fibre optic cable including a transmit fibre and a receive fibre.

23. The method of claim 14, wherein at least one of said first, second, third, and fourth detection modules selectively resets said fabric interface link upon detection of an error.

* * * * *

UNITED STATES PATENT AND TRADEMARK OFFICE
CERTIFICATE OF CORRECTION

PATENT NO.       : 7,289,436 B2
APPLICATION NO.  : 10/271564
DATED            : October 30, 2007
INVENTOR(S)      : Schaller et al.

It is certified that error appears in the above-identified patent and that said Letters Patent is hereby corrected as shown below:

Claim 15, column 25, line 60: Insert the word --said-- after the word "wherein".

Claim 18, column 26, line 24: Replace the word "diction" with the word --detection--.

Claim 19, column 26, line 33: Insert the word --port-- after the word "interface".

Signed and Sealed this

Eighteenth Day of March, 2008

JON W. DUDAS
*Director of the United States Patent and Trademark Office*